United States Patent [19]

Issa et al.

[11] Patent Number: 5,646,591
[45] Date of Patent: Jul. 8, 1997

[54] ADVANCED METHOD OF INDICATING INCOMING THREAT LEVEL TO AN ELECTRONICALLY SECURED VEHICLE AND APPARATUS THEREFOR

[75] Inventors: Darrell Issa; Jerry Birchfield, both of Vista, Calif.

[73] Assignee: Directed Electronics, Inc., Vista, Calif.

[21] Appl. No.: 468,703

[22] Filed: Jun. 5, 1995

Related U.S. Application Data

[63] Continuation-in-part of Ser. No. 945,667, Sep. 16, 1992, Pat. No. 5,534,845, and Ser. No. 433,819, May 4, 1995, abandoned, which is a continuation-in-part of Ser. No. 112,940, Aug. 30, 1993, Pat. No. 5,532,670, which is a continuation-in-part of Ser. No. 886,871, May 22, 1992, abandoned.

[51] Int. Cl.$^6$ .................................................... G08B 13/22
[52] U.S. Cl. ........................................... 340/566; 340/429
[58] Field of Search ..................................... 340/429, 566

[56] References Cited

U.S. PATENT DOCUMENTS

| | | | |
|---|---|---|---|
| 4,584,569 | 4/1986 | Lopez et al. | 340/429 |
| 4,866,417 | 9/1989 | DeFino et al. | 340/429 |
| 5,084,697 | 1/1992 | Hwang | 340/566 |

*Primary Examiner*—Glenn Swann
*Attorney, Agent, or Firm*—Sam Talpalatsky

[57] ABSTRACT

A method of indicating a degree of incoming threat to an electronically secured area consists of the steps of sensing via sensor a degree of threat delivered to a secured area and generating an electric signal proportional to the degree of threat; analyzing the signal to determine if it is a low degree of threat or a high degree of threat; and producing either a first pulse representing low degree of threat or separately producing the first pulse and a second pulse representing a signal having both low degree of threat and high degree of threat.

94 Claims, 15 Drawing Sheets

ADVANCED METHOD OF INDICATING INCOMING THREAT LEVEL TO AN ELECTRONICALLY SECURED VEHICLE AND APPARATUS THEREFOR

RELATION TO OTHER PATENT APPLICATIONS

This patent application is a continuation-in-part (C-I-P) of patent application Ser. No. 08/433,819 filed May 4, 1995, entitled "Method Of Indicating The Threat Level Of An Incoming Shock To An Electronically Secured Vehicle and Apparatus Therefor," now abandoned; which is a continuation-in-part (C-I-P) of patent application Ser. No. 08/112,940 filed Aug. 30, 1993, entitled "Method Of Indicating The Threat Level Of An Incoming Shock To An Electronically Secured Vehicle and Apparatus Therefor," now U.S. Pat. No. 5,532,670; which is a continuation-in-part (C-I-P) of patent application Ser. No. 07/886,871 filed May 22, 1992, entitled "Method Of Indicating The Threat Level Of An Incoming Shock To An Electronically Secured Vehicle and Apparatus Therefor," now abandoned. This patent application is also a continuation-in-part (C-I-P) of patent application Ser. No. 07/945,667 filed Sep. 16, 1992, entitled "Advanced Automotive Automation And Security System," now U.S. Pat. No. 5,534,845 Aforementioned U.S. Pat. Nos. 5,532,670 and 5,534,845 as well as applications Ser. Nos. 07/886,871 and 08/433,819 are hereby incorporated by reference.

BACKGROUND OF THE INVENTION

1. Field of the Invention

This invention pertains to the field of electronic security systems that detect unwanted intrusions into secured areas and sound an audible alarm in response thereto. More particularly, the invention pertains to a method of differentiating between a high degree of intrusion or threat such as a shock or a low intensity degree of intrusion or insubstantial threat, received by the protected structure or object, and executing an appropriate alarm as well as preventing nonphysical, random energy inputs from tripping the security alarm.

2. Description of the Prior Art

Electronic security systems have been used for some years and their popularity increases as the national crime rate continues to climb. Most such systems, especially those used for protection of automobiles, include a controller, a series of intrusion sensors for detecting attempted intrusions through doors, hood, and windows, an alarm for activation upon receipt of a signal or signals from the sensors indicating an attempted unwanted entry into the vehicle, and a power source, normally the vehicle battery, to power the system and sound the alarm. Other components are often included such as automatic resetting circuits and shut-down devices for use when the alarm needs to be deactivated. These systems may be original equipment on new vehicles or retrofitted on existing vehicles.

The security systems may be effected by a nonphysical signals, or electrical surges commonplace in the automobile circuitry. The intended arming and disarming of an alarm system is usually performed by sending a digitally coded signal, by a hand-held transmitter operated by one or more push buttons. In addition, other such systems may be armed by mere passage of time following the driver's act of turning off the engine and exiting the vehicle with the doors and windows closed and after a short time interval such as thirty (30) seconds. Thereafter the system may be disarmed by a hand-held transmitter or by a delay circuit that activates the alarm if the system is not disarmed by the driver upon entry into the vehicle. The first type of arming is known as "active arming" while the latter is known as "passive arming".

Upon detection of an attempted intrusion into the vehicle by one of the sensors, the alarm is activated for a period of time, for instance thirty (30) seconds to one (1) minute, and then, if the alarm has not been disarmed by the remote transmitter or by the manipulation of a "kill" switch, mounted interior the vehicle, usually in a hidden area therein, the alarm response terminates or times-out and the security system is once again reset to monitor the sensors and triggers.

One form of such a sensor is called a "shock" sensor. The shock sensor technology of this invention is discussed in Applicant' patent application Ser. No. 08/112,940. However, a number of other sensors may be employed within the alarm system of this invention. This invention includes, but is not limited to, the application of shock sensors, motion sensors, field disturbance sensors, sound discriminators, ultrasonic sensors, current sensors and other sensors which sense disturbance or threat applied to or about an area and generate an electrical signal in response thereto. An incoming threat to the protected area such a vehicle includes threats such as physical impact, activity in or about the vehicle, breach of the vehicle electric system, the sound of breaking glass, or other activity results in the sensing of the activity and generation of an electrical signal which is then interpreted by the alarm controller to generate an alarm response.

Certain problems exist with conventional security systems that render their usage less than desirable under certain circumstances. For example, a shopping cart inadvertently bumped against the vehicle will usually cause a full alarm response. While the alarm is certainly necessary to alert the owner, inadvertent tripping of the alarm is annoying and could result in either the owner becoming frustrated, and thereafter not activating the alarm, or convincing the shopper or other car owners that such a loud, annoying alarm is not what they want in their vehicles.

In other situations, certain transient electric fields can invade the circuitry of the alarm system and generate enough of a signal to trip the alarm even in the absence of intrusion to the secured area. When a warn signal is generated by the alarm, it flashes the running lights which generates electrical surges or transients. These transients may generate electrical signals which may feed into the alarm circuitry where they are amplified and trip full alarm. In other situations, such as where a cellular telephone is used about the vehicle, the initial surge of the wireless transmission signal may be sufficient to generate an actuation level signal resulting in the activation of the alarm. Still further, in isolated cases, such as where a police car parks behind a protected area and the officer "keys" the microphone on his radio, the surge from his transmitter could interact with the anti-theft system induction coil and produce a false alarm.

Still further, there are instances where a disturbance continues unabated after the initial activation of the alarm sequence. For instance, a vehicle parked next to a train station may receive an alarm input generated by a passing train. The alarm will commence and terminate after running its course, yet often the train has not passed completely by the vehicle. In the prior art, the alarm will sound again because of the continuous input of energy from the train. This can be of annoyance to others in the area.

Crowded parking lots are prime areas for car theft. In these cases, dissatisfaction with the anti-theft system may cause the owner to cease arming the system thus rendering the vehicle subject to theft. This condition, if not corrected, may cause other vehicle owners to cease purchasing such security systems for fear of annoying others and thereby undermine the desirability for and effectiveness of anti-theft devices.

What is needed to circumvent the drawbacks heretofore described is (1) a vehicle security system capable of differentiation between a light, generally non-threatening intrusion event and a stronger, usually security-threatening intrusion event to the vehicle and output a pulse to the alarm circuit appropriate to the degree of intrusion about the secured area, and (2) a vehicle security system that will discriminate between the non-threatening events and block them or otherwise divert the signals they produce so that an alarm is not generated.

SUMMARY OF THE INVENTION

This invention is a novel method of dealing with these problems and discriminating between the degree of threat from the incoming intrusion sensors. For example, the alarm system of this invention generates a mild audible chirp in the event one lightly touches a protected vehicle while loading groceries in a parking lot. Conversely, a full alarm response is generated if the car is towed or a crow-bar applied to its exterior. The low intensity alarm is called a "warn-away" and is of a serious, but far quieter nature and will generally generate the proper message of alarm presence to the intruder without engaging the full alarm. The person inducing the threat is thereby quietly, but convincingly advised by prerecorded voice or a series of soft chirps of the limited intrusion he or she has caused, without activation of ear piercing audible alarm response. Further, the owner and other people are not disturbed or embarrassed by a full alarm response caused by an innocent individual.

In addition, this invention includes the novel feature of providing full wave rectification of the output signal from the sensor and ignoring the first few milliseconds of the signal produced. Additionally, the present invention requires the signal to drop to its zero (0) level or reference voltage before triggering warning alarm. This allows an alarm condition to be registered only upon sensing actual intrusions on or about the protected area, as compared with non-physical intrusions generated by EMF or RF fields about the protected area. These features therefore eliminate the spurious signals that are produced by nonphysical threat conditions.

Most security systems involve only half-wave rectification of the induced signal emanating from the sensor. In the event the signal generated by a sensor generates a signal having positive and negative components the signal and in the event there is only partial rectification of the signal. The resulting rectified signal would be of unnaturally low value and not be an accurate reproduction or indication of the full intensity or degree of the incoming threat to the protected area. This practice is consistent with sensors employed to trigger the alarm system, but is unacceptable to the present invention which looks at the degree of the intrusion. Thus, to determine the degree of the intrusion sensed by a sensor, the present invention analyzes the peak to peak value of the sensor signals to determine the true degree of intrusion.

The method and apparatus disclosed herein analyzes the signal produced by various sensors having the capability of generating an electric signal upon sensing an intrusion event. Depending on the strength or value of the sensor signal, a mild or low intensity degree of intrusion generates a pulse having a short pulse-width generating a warn-away alarm that will automatically reset itself without requiring intervention by the vehicle owner. The same method and apparatus is capable of generating a longer pulse-width pulse which generates both a mild, warn-away alarm response as well as a stronger, full alarm response.

When the low threat level, "warn-away" pulse is generated by the alarm system, the alarm system of this invention continues to monitor its sensors and is capable of immediate activation of a full alarm upon sensing a high degree of intrusion as reported by one or more of its sensors, even while a warn-away alarm is being given. If two or more mild shocks are received by the vehicle within a finite time period, seven (7) seconds for example, the system will produce a full alarm, whereas if the mild shocks are repeated on a sequence longer in time than seven (7) seconds, a second and repeated "warn-away" alarm will be produced again.

The prior art alarm system have not yet appreciated these features and continue to generate repeated "warn-away" or full alarms. In fact, in some cases the energy dispensed in the "warn-away" alarm is of sufficient magnitude to generate a low-threat level input that triggers another "warn-away" alarm so that the system continues to cycle "warn-away" alarms each induced by the preceding alarm.

Further, this invention contains the unique property of ignoring the first few milliseconds of signal produced by a sensor. A real threat condition usually lasts far longer than the ignored duration and the energy level of the residual signal is sufficient to pass through an integrator to a comparator to determine the relative degree of the threat. The signals produced by RF bursts, EMF bursts and other non-threatening or non-physical phenomenon typically do not last beyond that period and still cause a threat situation. Accordingly, those signals produced by non-physical and/or non-threatening phenomenon will be disregarded and will not cause the alarm systems to enter into an alarm condition.

To overcome the problem of repeated sirens during periods of extended sensor input, such as in the train passing example, or even when a truck or other heavy vehicle passes the parked car, means are provided to prevent repeated alarms as long as the initial input remains within a given intensity for an extended time. For instance, as long as the intensity level of the input signal remains rather constant following cessation of the full alarm signal, the circuit will not process another sensor input until this signal disappears and reappears again. This means that the prolonged motion the train passing nearby a protected vehicle, which generates a sensor input, will not cause the alarm to sound again and again. This feature also prevents continuous alarm outputs in those cases where the sensor is in a state of a continuous output. The state of continuous sensor output may be mechanical in nature (the train example) or from electrical disturbances.

In a second embodiment of this invention, the circuit is designed such that fewer wires need be used to attach the sensor to the alarm giving rise to a savings in material and reduction in installation time and training.

The prior art has recognized some of these problems, however, to date there has been little success achieved in solving them. In the patent to Hwang, (U.S. Pat. No. 5,084,967) a "motion detector" is allegedly connected to a pair of signal amplifier circuits that, upon receipt of a long signal or a series of short pulses from the detector, will sound a "full" alarm whereas, upon receipt of a shorter pulse signals, will sound a "pre-entry warning", lesser in severity than the "full" alarm. However, this patent discloses that the "detector" is a time-dependent switch. Therefore the degree of threat is determined by its duration, not its physical degree. The schematic of the Hwang device shows the use of components that are arranged as a switch to turn on and off a transistor to allow the detected signal pass on to the alarm warning device. Thus, there is no comparison of the "level of intensity" of the signal, but merely the "duration" of the signal. This is not an accurate assessment of the degree of threat sensed by the sensor and reproduced into an electrical signal and does not differentiate between "intensities" of the physical and non-physical inputs. Moreover, the output signal from the device of Hwang Patent proceeds directly to the siren, whereas the device of the present invention interposes another device, the alarm control module or alarm controller, that determines what level of alarm is generated.

Accordingly, the main object of this invention is a method and apparatus for use on about an electronically secured area that responds differently to different degrees of threat sensed by the sensors arranged therein. Other objects of the invention include a method and apparatus that has at least two levels of intensity determination, one for a low degree of threat received by the vehicle to produce a pulse that may be used to trigger a warning of a stronger alarm, should the threat not be discontinued, and a separate pulse that may be used to trigger a stronger, louder alarm for non-discontinued light shocks and stronger shocks; a method and apparatus for producing a pulse that may be used to trigger a warn-away audible alarm that may be repeatedly sounded to signify the vehicle is under electronic security while not producing a pulse that may trigger the loudest alarm so as to minimize the disturbance to those nearby in the event of a non-threatening disturbance received by the vehicle; a method and apparatus that maintains readiness to produce a pulse that may be used to trigger an audible alarm even while a warn-away alarm message is being used; a method and apparatus for detecting a signal produced by a non-physical assault on the vehicle, such as by a burst of RF energy or EMF energy, and for removing it from interaction in the system circuitry; a method and apparatus that provides full wave rectification of the induced signal to provide a more accurate analysis of the threat inducing the sensor signal; an apparatus which does not continue to sound an alarm in the event a generally constant and continuous disturbance such as a moving train; an apparatus having the ability to communicate the level of threat in a pulsewidth of the sensor output pulse, thereby eliminating a dedicated wire connection for each alarm stage; an apparatus that may be retrofitted into existing vehicles as well as included as original equipment on new vehicles; and, an apparatus that will automatically rearm upon the completion of a measured length of the warn-away or the full alarm; circuitry that can be maintained in an integrated circuit thereby providing economy of manufacture, improved reliability, space savings and less power consumption. These and other objects of the invention may be obtained by reading the following specification along with the drawings that are appended hereto. The protection sought by the inventor may be gleaned from a fair reading of the claims that conclude this specification.

DESCRIPTION OF THE PREFERRED EMBODIMENT

Figure 1:
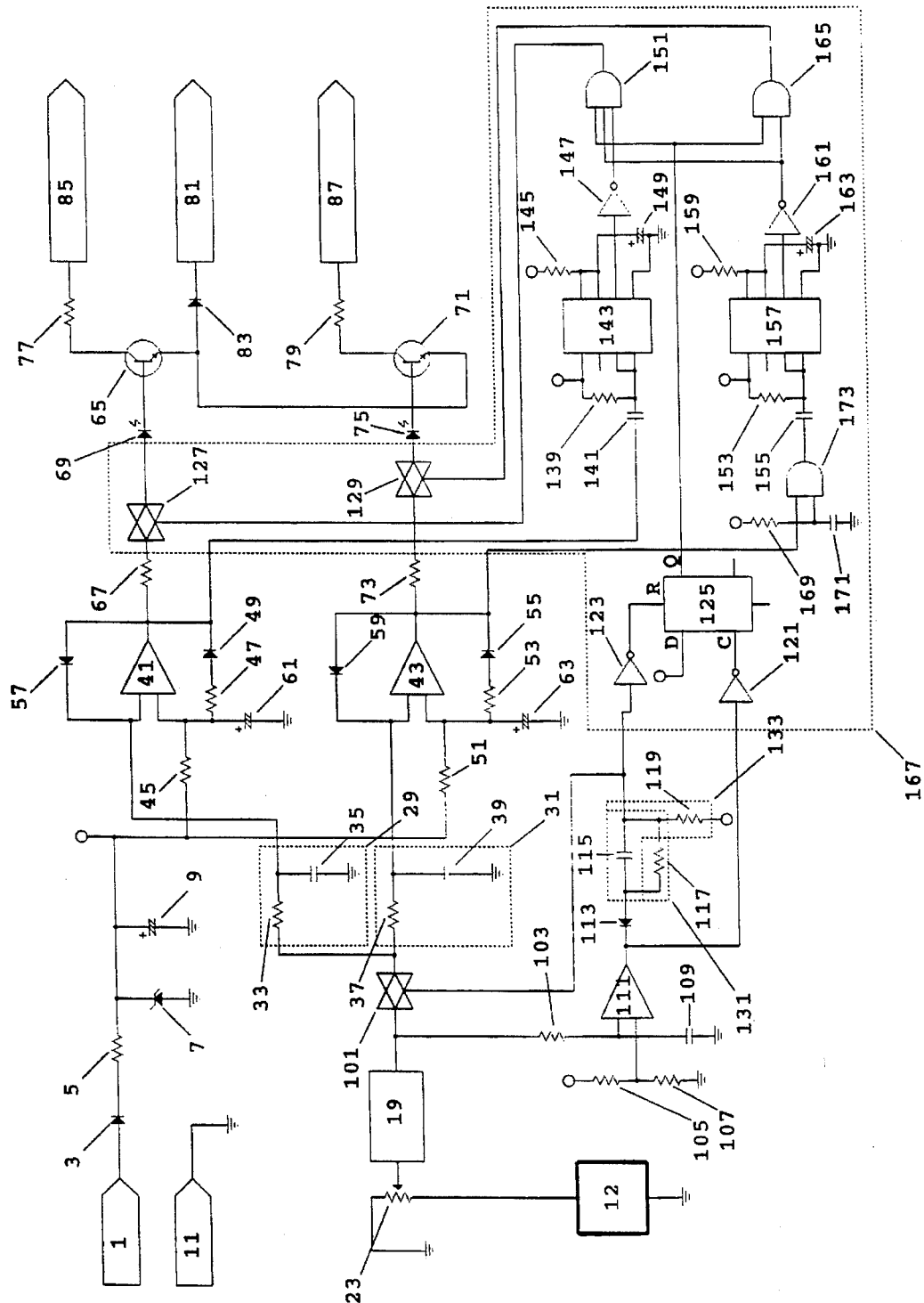
FIG. 1 is a schematic diagram of the apparatus of this invention.

The novel method of this invention for indicating the threat level of an incoming threat to an electronically secured structure, such as a vehicle comprises, the steps of sensing a threat delivered to an area, generating an electric signal the strength of which is proportional to the intensity of the threat, ignoring the first portion of the signal so as to remove from further consideration those disturbances that are non-physical or non-threatening, analyzing the remaining signal to determine if it is of a low, generally non-threatening intensity or of a higher, generally security-threatening intensity, and producing either a first pulse that triggers a low intensity "warn-away" alarm, or separate first and second pulses, representing a signal containing both the low intensity and higher intensity components, that trigger both a low and a high intensity alarms. The step of generating an electric signal includes generating an alternating current signal whose amplitude and period is proportional to the intensity of the physical shock. FIG. 1 shows the apparatus of this invention.

In FIG. 1 the solid lines between components refer to conductors and will not be individually numbered except where necessary. Where conductors cross and the intersection is marked with a dot or period, it is a junction; where one conductor crosses another and the intersection has no dot or period, there is no junction. As shown in FIG. 1, an input voltage, generally in the range of from about six to about eighteen volts d.c. is inputted from a battery (not shown), such as a car battery or other source of direct current, to an input terminal 1. The current is regulated by a reverse flow protection diode 3, a surge limiting resistor 5, an over-voltage protection Zener diode 7 and a filter capacitor 9 to produce a steady flow of direct current. The ground return enters at input terminal 11.

The sensors employed by the present invention are interchangeable. Different sensors are employed for different functions within the alarm system and their selection depends in large by the anticipated environment within which the user expects to keep the protected property. Some of the more common sensors are shock sensors, motion sensors, field disturbance sensors, sound discriminators, ultrasonic sensors and current sensors. The shock sensors known in the art are mechanical, mercury movement, magnetic induction, and piezo types. Applicant' patent application Ser. No. 08/112,940 disclosed Applicant's preferred embodiment of the shock sensor.

Mechanical shock sensors use a weighted cone at the end of a spring which makes electrical contact with a fixed pointer upon an impact, creating an output pulse.

Mercury sensors consist of two designs. The first design is the mechanical contact type. The second design is one in which mercury is suspended inside an inductor that is part of an electronically tuned circuit. In both designs an impact results in the mercury remaining in a fixed position, while everything else moves about with the impacted vehicle.

The magnetic induction shock sensor uses a magnet suspended by an elastic band such as rubber, silicon or spring near a high value inductor. The inductor usually has an iron or ferrite core. An impact moves the sensing inductor while the magnet remains fixed, creating an impact AC signal in the inductor. The signal is typically amplified, detected, integrated and then compared with preset levels to determine whether or not to generate an output signal.

The piezo shock sensor uses a weighted piezo sensor. A mechanical resonance of approximately seventy (70) hertz is created by adding mass to the piezo sensor. This aids in the detection of impacts to the vehicle. Similarly, the weight remains fixed while the balance of the piezo sensor moves about with the impact to the vehicle.

Another type of sensor employable by this invention is a motion sensor. Motion sensors sense very slow movements of the vehicle. These movements could be caused by jacking, lifting, moving, or any other type of slow movement of the protected object. These movements may be sensed by several methods such as a weighted pendulum with mechanical or electronic contact, mercury movement switch or mechanical/electronic movement sensing devices, or any other slow movement sensing system.

Another type of sensor employable by this invention includes a field disturbance sensor. Field disturbance sensors sense motion of objects such as the human body in a microwave radio frequency field in or about the protected area. The presence of the moving object disturbs the microwave field and creates a disturbance therein. This results in a change of the sensor output signal. This disturbance is both reflective and absorptive in that all objects absorb and reflect RF energy. A multichannel sensor generates an output signal proportional to intensity of the detected disturbance. A single channel sensor only generates a signal if the present threshold is exceeded. Additionally, a pulsed microwave signal could be generated to look for time of signal return. This, however, requires a more complex sensor and circuit than the above field disturbance sensor.

Another type of sensor employable by this invention includes a sound discriminator. Sound discriminator senses a high frequency sound disturbance in or near the protected area and is normally used to sense the breaking of glass and/or metal to metal sounds. The sensor normally uses an electric condenser microphone to sense the sound and convert it to an AC signal. This AC signal is amplified and processed through a high pass and/or band pass filter(s). The signal is then detected and compared to preset thresholds. An output pulse indicative of the intensity of the disturbance is then generated and output.

Another type of sensor employable by this invention includes an ultrasonic sensor. An ultrasonic sensor can work on the same principle as the field disturbance sensor (doppler frequency shift), but uses an ultrasonic sound field instead of an RF energy field. In a second embodiment, the sensor uses an ultrasonic sound generator (transmitter) to set up a field of sound waves usually at forty (40) kilohertz. An ultrasonic sensor (receiver) then detects any disturbance. This signal is then amplified and detected generating an output pulse or pulses according to the level of disturbance. In a third embodiment, the ultrasonic sound could be pulsed to measure the movement of and distance to the object creating a disturbance.

Another type of sensor employable by this invention includes a current sensor. Current sensors sense the change in battery voltage caused by the activation of devices which in turn produces a current load. There are at least two different types of current sensors. One type senses only small changes in voltage created by any load being turned on, while the second type detects a sudden large change in voltage, such as a surge created by incandescent lights being turned on. The first type of sensor is simpler and easier to manufacture, while the incandescent light sensor does not require an external input to disable the circuit when the vehicle automatic electrical cooling fans turn on. The current sensor is usually employed to sense the under hood, trunk, and/or dome lights turning on when an unauthorized entry is made.

Each and every sensor heretofore mentioned senses a particular type of intrusion and produces an electrical signal proportional to the degree of threat sensed. Other types and kinds of sensors capable of sensing particular conditions and providing an electrical signal in response thereto are not mentioned, but are contemplated within the scope of this invention. The above mentioned sensors will be collectively referred to as sensor means 12.

The step of analyzing the signal to determine if it is of a low or high intensity includes the first step of passing the signal through a switching capacitor amplifier 19 to provide full wave rectification, i.e., the negative portions of the signal are converted to positive portions. Accordingly, the output of amplifier 19 is always positive and will give an approximately equal output regardless of the polarity of sensor means 12 signal. This overcomes the shortcomings of a sensor having a signal operating in the positive and negative region in respect to the system ground. This allows the entire dynamic range of the signal to be offset/rectified to a positive voltage. The gain of amplifier 19 is fixed at a predetermined value. A potentiometer 23 is used to adjust the level of the input from sensor means 12.

A normally closed, analog, bilateral switch 101 is provided and connected between amplifier 19 and an inverting comparator 111. In other embodiments of the invention comparator 111 is not inverting. It is opened for a predetermined amount of time such as a few, i.e., 5, milliseconds at the beginning of each pulse string, as will be hereinafter more fully set forth, in order to cut off, delete or disregard the first portion of the signal output from amplifier 19. This cut off is employed to prevent extraneous, non-physical energy surges, such as RF and/or EMF fields, as hereinbefore described, from tripping the alarm.

Another significant feature of the present invention provides for removal from consideration of signals which do not disappear and later reappear. The signals which do not disappear and later reappear are disregarded by this device to prevent continuous alarm outputs which are a nuisance. This is particularly helpful where the alarm system is operating in an area having exposure to phenomenon of prolonged duration such as a freight train passing nearby the alarm system. As the train passes, it generates a vibration which likely has an intensity sufficient to generate an alarm. In practice, this type of disturbance is not well received by alarm systems because the alarm system will generate an alarm which ceases after a predetermined time and which is regenerated again and again as long as the disturbance continues about the area. This provides for much frustration to the owner of the alarm system and the people nearby, thereby reducing its effectiveness. To overcome this problem, the alarm of the present invention monitors the signal causing the alarm. In the event this signal/disturbance continues to be present at a generally constant intensity for a time greater then the duration of the alarm response, the second and subsequent alarm responses are not generated until such time as the signal generated by the disturbance disappears and then reappears again. In practice this provides for one cycle of alarm response if the alarm system detects a disturbance such as a moving train. The alarm response will not be repeated over and over again until such time as the disturbance caused by the train disappears and then later reappears.

Switch 101 is nominally in a closed position and is held closed by the power supply voltage less voltage drop through resistor 119. Shutting off or opening of switch 101 is accomplished by use of an inverting comparator 111 and its associated circuitry. Resistors 105 and 107 establish a reference voltage for comparator 111. Resistor 103 and capacitor 109 filter out high frequency transients on the input to comparator 111. In the event a continuous high frequency signal is present at the input of sensor means 12 or at the output of amplifier 19, the high frequency filter 103 and 109 could lead to a continuous, low DC signal output at the output of comparator 111. This inhibits clocking of D flip-flop 125 which in turn opens switches 127 and 129 until the output of comparator 111 changes state and produces a clock signal at the clock input of D flip-flop 125.

As a signal inputted to comparator 111 goes high, the output of comparator 111 goes low and is coupled through a diode 113 and a capacitor 115 to switch 101. Therefore the source voltage for keeping switch 101 in its closed position is shorted for a predetermined duration of time through capacitor 115, which provides for opening of switch 101 for that duration of time. By adjusting the capacitance of capacitor 115, a delay, such as 5 milliseconds is required to charge capacitor 115 in order to turn bilateral switch 101 back on. Resistor 117 is provided as the discharge resistor for capacitor 115 and its value is chosen so that capacitor 115 will not discharge for several hundred milliseconds so as not to interrupt the signal pulse string. The discharge time of capacitor 115 is such that only the first few milliseconds of any pulse string is allowed to be coupled through capacitor 115 and diode 113 to shut off analog bilateral switch 101.

The next step, after passing the amplified signal through switch 101 is to input this amplified signal simultaneously to two separate and independent voltage integrators, 29 and 31, shown within dotted line perimeters, that are connected in parallel to the output of amplifier 19. Integrator 29 comprises a resistor 33 and a capacitor 35 while integrator 31 comprises a resistor 37 and a capacitor 39. The ratio of sensitivity of integrators 29 and 31 is adjusted, by varying the resistance of resistors 33 and 37 and varying the capacitance of capacitors 35 and 39 to the order of approximately 5:1 so that integrator 29 is approximately five times as sensitive as integrator 31. This ratio can be varied outside of 5:1 under certain circumstances such as where the vehicle is unusually large.

The next step is to send the output of integrators 29 and 31 to a pair of separate voltage comparators/pulse generators 41 and 43 that are equally referenced from input terminal 1. The reference for voltage comparator 41 is established by resistors 45 and 47 and a diode 49 while the reference for voltage comparator 43 is established by resistors 51 and 53 and a diode 55. Another pair of diodes 57 and 59 are used to latch the respective voltage comparators 41 and 43 when their respective input signals exceed the comparator reference voltages.

The next step in this novel method is for the pulse generator portion of comparators/generators 41 and 43 to output either a first pulse from generator 41 representing a low intensity signal or separate first and second pulses from both generators 41 and 43 representing a signal containing a low intensity and a high intensity component. This is performed when voltage comparator 41 or 43 is latched through either diode 57 or diode 59 when the incoming signal from integrators 29 or 31 exceeds the reference voltage thereto. Once latched, the respective comparator produces an output pulse timed by resistor 45 and capacitor 61 with respect to comparator/pulse generator 41 or by resistor 51 and a capacitor 63 with respect to comparator/pulse generator 43 to one of two drive transistors 65 and 71.

Output drive transistor 65 receives the output pulse from voltage comparator/pulse generator 41 through a resistor 67 and an indicating light emitting diode 69 for the duration of the pulse from generator 41. The other output drive transistor 71 receives the output pulse from voltage comparator/pulse generator 43 through a resistor 73 and an indicating light emitting diode 75 for the duration of the pulse from generator 43. Resistors 77 and 79 are current limiting resistors employed to protect transistors 65 and 71 respectively. The outputs are enabled by a ground placed on terminal 81 through a diode 83. The outputs are fed respectively to terminal 85 to connect to a warn-away alarm circuit (not shown), and to terminal 87, to connect to the full alert alarm circuit (not shown). The output pulse for the warn-away alarm, from terminal 85, may be set at one length, such as 200 milliseconds, and the output pulse for the full alarm from terminal 87 may be set at a different length, such as approximately 1 full second.

The negative voltage, 5 millisecond pulse from comparator 111 is inverted by inverter 123. This provides a logic one pulse which resets and holds in reset for the 5 millisecond period (determined by capacitor 115) the "D flip-flop" 125. This achieves the function of discarding from consideration a continuous signal having a frequency such that this signal represents a DC signal at input of comparator 111. Thus, this signal will eliminate any clock activity to D flip-flop 125 until such signal disappears and again reappears. The "Q" output of 125 is connected to the inputs of "AND GATES" 151 and 165, causes the outputs of 151 and 165 to go low. The low signals at the outputs of 151 and 165 opens normally closed analog bilateral switches 127 and 129. This prevents any output from pulse generators 41 and 43 being coupled to output transistors 65 and 71.

After the end of the 5 millisecond reset pulse, the "Q" output at flip-flop 125 is set high by a clock signal created by comparator 111. This clock pulse is inverted by inverter 121 to present the proper input to the 125 clock input. The sensor outputs 85 and 87 are now enabled for the duration of the output pulse(s) created by pulse generators 41 and 43.

As mentioned before, this invention provides for the embodiment where the alarm will not be continuously triggered by a relatively constant threat signal which persists without interruption. One application for this feature is an armed alarm system which is triggered by a train. Ordinary alarm systems continue to sound its warning for the duration of the threat signal. The alarm system of the present invention provides for a single cycle of alarm and does not sound the alarm again until the threat signal disappears and again reappears. Therefore in the example of the passing train, the alarm would sound for one cycle, such as 2.5 seconds for the warn-away and 30 seconds or a minute for a full alarm, and as long as the train threat does not disappear (i.e. the train passed) and again reappear (i.e. another train appears) the system of the present invention will not sound the alarm again. The following circuit provides this function.

Output bypass timers 143 and 157 are triggered and reset from the trailing edge (negative going edge) of the output pulses from 41 and 43 respectively. The output of full alarm pulse generator 43 is applied to timer 157 via AND gate 173. When any input of an AND gate goes low, its output goes low. All inputs of an AND gate must be high to get a high at its output. These triggers are coupled to the inputs of the 555/556 timers by coupling capacitors 141 and 155 respectively. Resistors 139 and 153 are pull-up resistors on the trigger input of their respective timers. Resistor 145 and capacitor 149 control the time that the "warn-away" output is disabled. Resistor 159 and capacitor 163 control the time that the "alarm" output is disabled. When the timers are triggered/reset, the timing capacitors 149 and 163 are discharged, the outputs go high, and the timing cycle is started. The outputs will go low at the end of the timing cycle.

The high output from warn-away bypass timer 143 is inverted by inverter 147 and applied to AND gate 151. The low at the input of 151 causes the output of 151 to go low opening bilateral switch 127. This interrupts any output from 41 and disables the warn-away output drive to output transistor 65. All warn-away outputs are therefore disabled anytime that warn-away bypass timer 143 is running. All repetitive triggers that occur inside the timing window are bypassed (disabled) on the warn-away output until the warn-away bypass timer expires (approximately ½ second). While the timer is running, if the output at 41 goes low (output pulse expires), the timing capacitor is discharged, and the timer is restarted with a full charging cycle duration to run.

Full alarm bypass timer 157, upon receiving a negative pulse from the trailing edge of the output pulse from 43 via AND gate 173, works identical to the warn-away bypass timer 143. The high output from 157 is inverted by inverter 161 and applied to AND gates 151 and 165. The low at the inputs of 151 and 165 causes the outputs of 151 and 165 to go low. This low output in turn is applied to the control input of bilateral switches 127 and 129. Both output drives are interrupted, disabling both outputs (warn-away and full alarm) for the duration of the full alarm output bypass timer 157 (several seconds).

The full alarm bypass timer 157 is also used as a power up reset timer. At power on capacitor 171 is fully discharged, applying a low at the input of AND gate 173. Capacitor 171 is slowly charged bias resistor 169 removing the low input from AND gate 173. The output of 173 is low during this charging period triggering full alarm bypass timer 157. Therefore, at power up, both outputs are disabled for several seconds until timer 157 times out.

Figure 2:
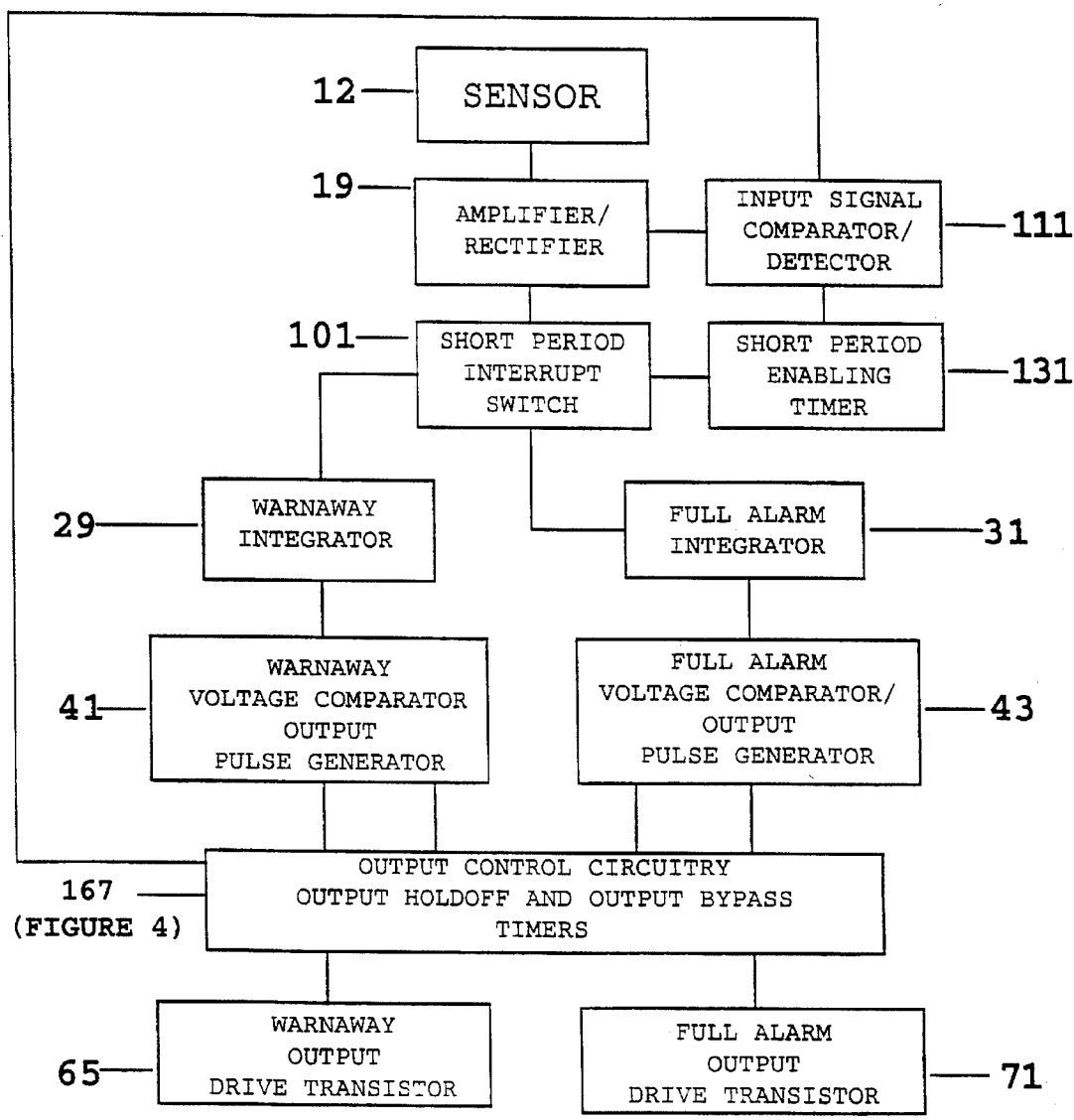
FIG. 2 is a flow diagram illustrating the operation of the apparatus generally depicted in FIG. 1.

FIG. 2 shows the flow of the induced signal and produced pulse through the circuit of FIG. 1. The sensor of sensor means 12 generates a signal the strength of which is proportional to the intensity or degree of the threat. Amplifier 19 provides full wave rectification and amplification of the signal for presentment through switch 101 to integrators 29 and 31 in parallel for integration of the total value of the pulse train less the first part thereof cut off by switch 101. The respective sensitivities of integrators 29 and 31 help to differentiate between a lower degree of threat which is likely non-threatening in nature and a higher degree of threat that represents a potential intrusion into the vehicle. The separate voltage comparators/output pulse generators 41 and 43 complete the differentiation and output a pulse to the output indicator and driver that results in one or both alarms being activated.

Amplifier 19, referenced by voltage from the car battery, amplifies all signals received from the sensor means 12. Integrators 29 and 31 ignore any signal whose peak-to-peak voltage is equal to or less than the amplifier reference voltage. Hence, very low signals generated by the sensor means 12 will not produce a signal or signals sufficient to activate voltage comparators/output pulse generators 41 and 43 to latch the respective unit and produce a pulse to be sent on to output drive transistors 65 and 71.

Upon receipt of a low degree threat signal, above the reference level of amplifier 19, the circuit will operate to activate voltage comparator 41, latch it, and produce a pulse that will activate the warn-away alarm trigger output (not shown) through terminal 85. While this is going on, the circuit remains fully prepared to receive and process other signals from the sensor means 12. In the event a high degree of threat is sensed by sensor means 12 while the warn-away alarm is given, the security breached alarm trigger output, will be tripped through terminal 87 and both alarm outputs will be tripped or triggered simultaneously. In all cases, both alarm trigger outputs are triggered when a high degree of threat is received, unless at the time of the time of threat input, warn-away output is disabled by the bypass timer 143, while only the warn-away alarm trigger output is tripped in response to a low degree of threat.

This invention also carries the capability to drive the vehicle's electronic security system's audible or visual warning devices directly or indirectly by use of an external control relay. Since the warn-away output pulses are short (approximately 200 milliseconds) and could be enabled by the vehicle's electronic security system, this greatly reduces the annoyance created by an alarm system's full alarm. The output drivers have the capability to drive output control circuits as long as a ground is applied to output control terminal 81. These output pulses are fed through output terminals 85 and 87 to directly or indirectly drive warning devices.

Figure 3:
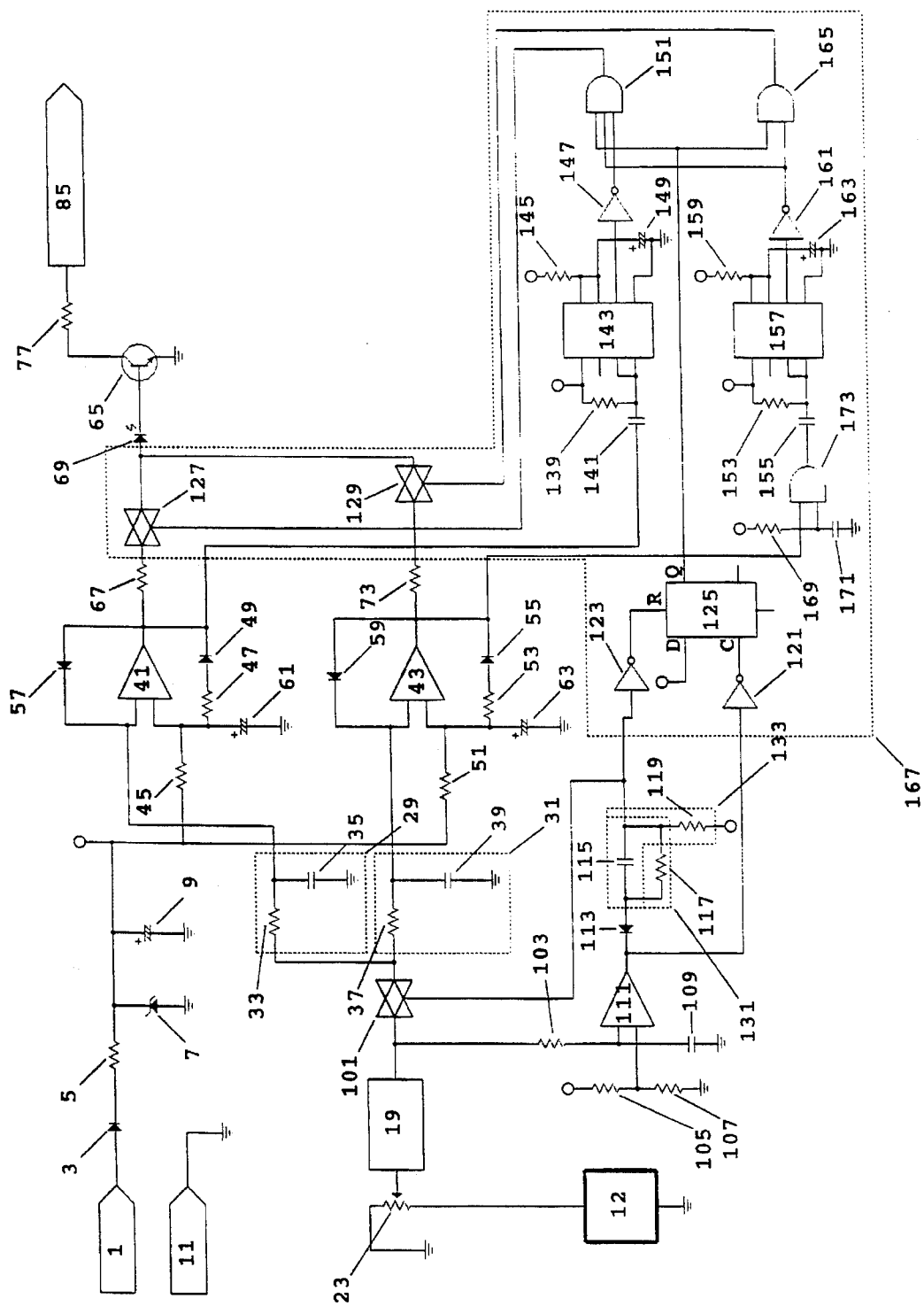
FIG. 3 is a schematic diagram of an alternate embodiment of the apparatus, showing less wiring needed to accomplish the same functions as shown in FIG. 1.

FIG. 3 shows an alternate embodiment of the invention. Changing the timing of the full alarm pulse generator 43 to a range greater then the warn-away 200 milliseconds allows for a considerable reduction in the output circuitry. This also reduces the installation time of the present invention. With a 200 millisecond warn-away output pulse and one second full alarm pulse, these pulses can be outputted or multiplexed on the same wire for applying to one such input of the alarm control module. In the same example full alarm output pulse generator 43/timing capacitor 63 is changed to 5 times its normal value. The full alarm output pulse time is therefore increased by a factor of 5.

The outputs from output pulse generators 41 and 43 are then applied to the common output indicating LED 69 and output drive transistor 65. This is accomplished through output drive current limiting resistors 67 and 73 and analog bilateral switches 127 and 129 connecting to a common conductor before reaching LED 69. Therefore the LED will indicate warn-away output with a short 200 millisecond light output pulse and full alarm output with a longer one second light output pulse. The output transistor 65 will be conducting, applying a ground or near ground potential to the collector for 200 milliseconds for warn-away and for one second for full alarm.

Figure 4:
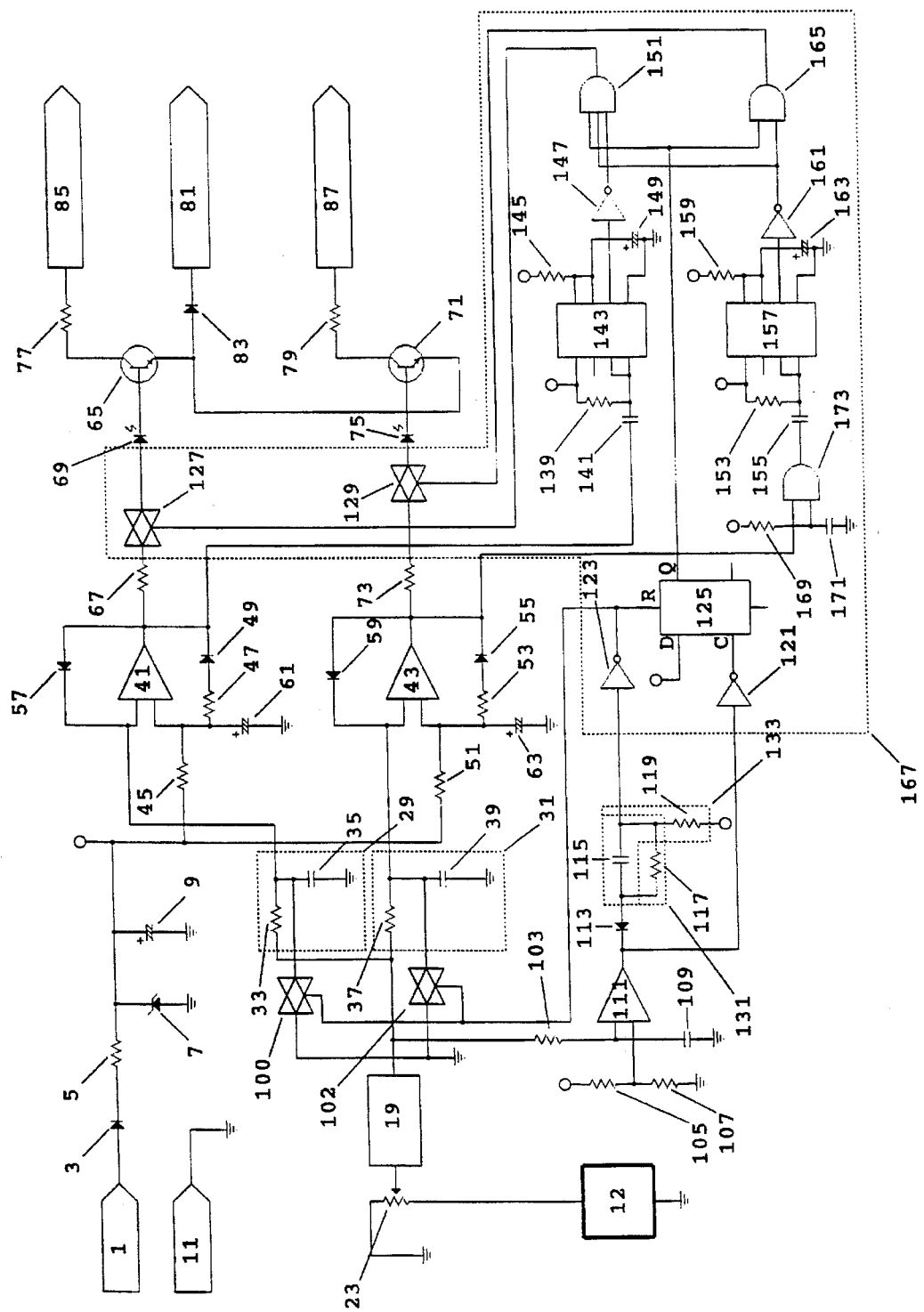
FIG. 4 is a schematic diagram of an alternate embodiment of the bilateral switch wiring shown in FIG. 1.

FIG. 4 represents a modification to the preferred embodiment shown in FIG. 1 and shows the output of the 5 millisecond timer 131 inverting the signal, by inverter 123, and feeding the output signal to two normally open, bilateral switches 100 and 102. The signal closes switches 100 and 102 for the 5 millisecond period. This keeps integrator capacitors 35 and 39 shorted out for the 5 millisecond time period. This represents another method of handling the signal.

Figure 5:
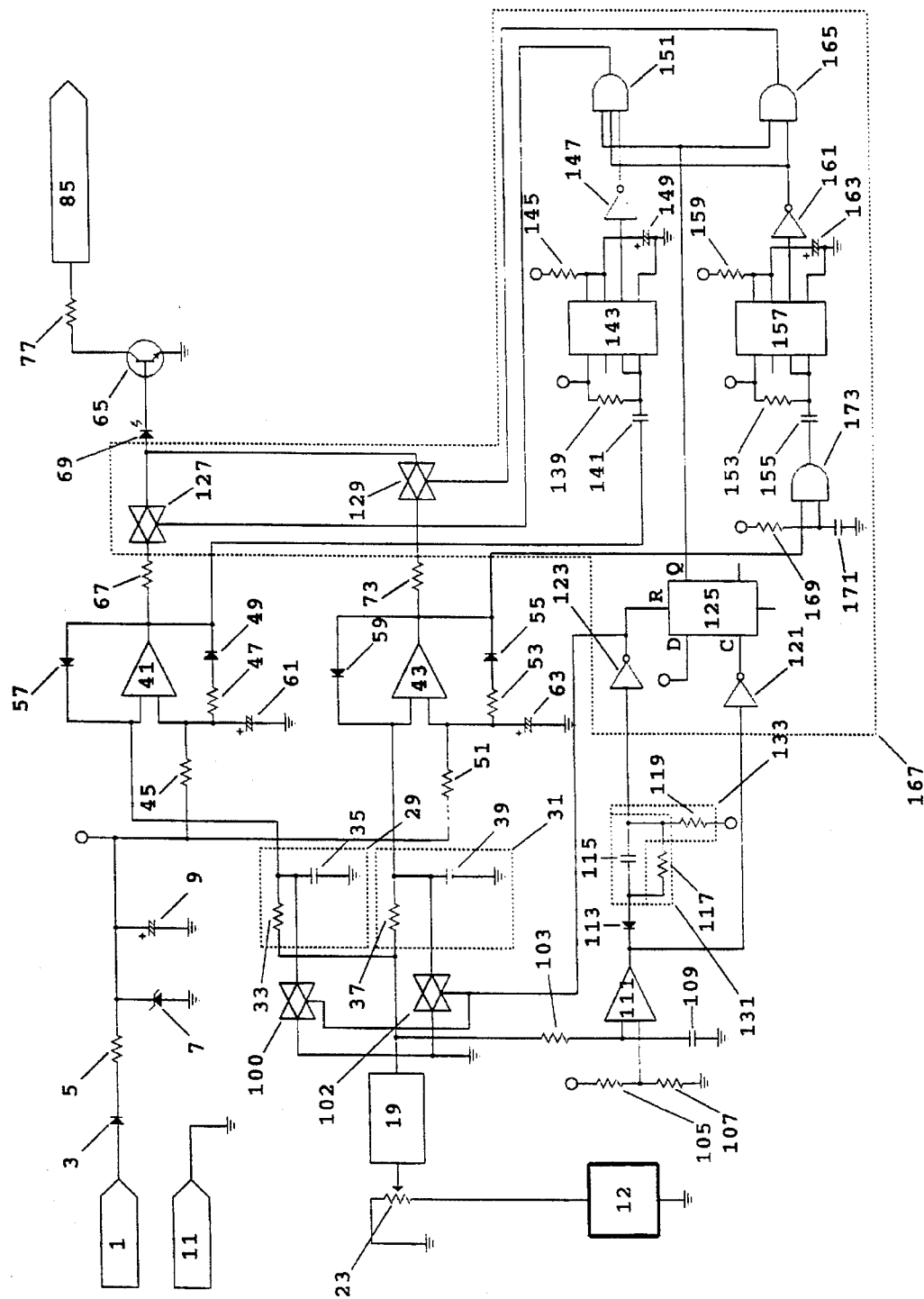
FIG. 5 is a schematic diagram of an alternate embodiment of the bilateral switch wiring shown in FIG. 3.

FIG. 5 represents a modification to the preferred embodiment shown in FIG. 3 and also shows the output of the 5 millisecond timer 131 to invert the signal, by inverter 123, and feeding the output signal to two normally open, bilateral switches 100 and 102. The signal closes switches 100 and 102 for the 5 millisecond period. This also keeps integrator capacitors 35 and 39 shorted out for the 5 millisecond time period. This represents another method of handling the signal.

Figure 6:
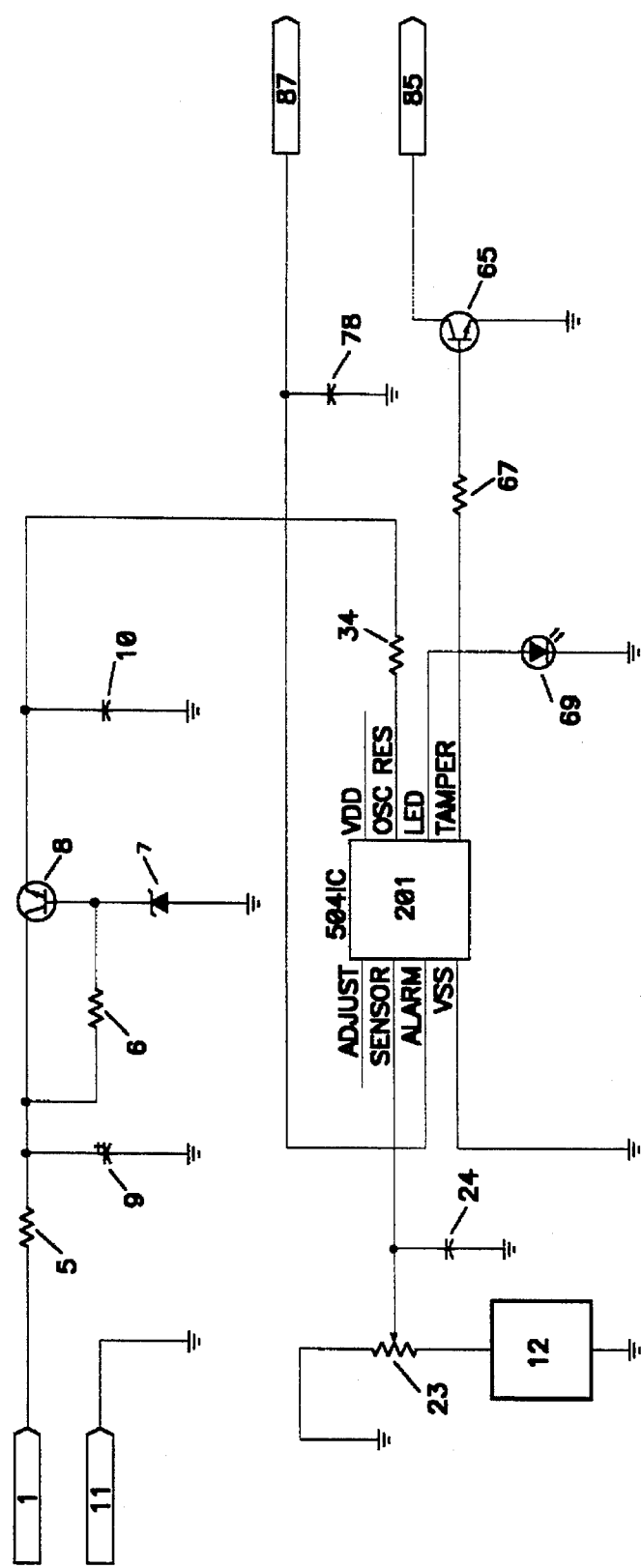
FIG. 6 is a top level schematic representation of an alternate embodiment of this invention.

FIG. 6 a schematic representation of an alternate embodiment of the of this invention. It is a schematic of a dual stage sensor that uses a custom CMOS integrated circuit (IC). FIGS. 7 through 15 are block diagrams and schematics of this custom CMOS integrated circuit. The schematic in FIG. 6 is the schematic of sensor means 12 being represented by a shock sensor 12. Although this embodiment is hereafter described employing a shock sensor, any sensor could integrate this device.

With the custom IC, there is substantial reduction in the number of parts required to build the product and subsequently the economic cost of the device. The part reduction is evident by the comparison of the part count in the discrete component embodiment of FIG. 5 and the device of the present embodiment shown in FIG. 6. The reduction in component count and their associated cost of assembly, allows for a significant reduction in the cost of the complete sensor unit.

A nominal plus 12.6 volts DC power source enters the sensor at terminal 1 and returns through terminal 11 (common). The current from this power source is limited by current limiting and filtering resistor 5. Capacitor 9 along with resistor 5 filters the transients in the power source. The voltage is then regulated down to 5 volts by resistor 6, zener diode 7, and transistor 8. Transistor 8, zener diode 7, and resistor 6 regulation method was chosen to reduce current in the sensor or to reduce the cost.

Sensor 12 supplies an alternating current (AC) voltage output indicative of the sensed input to the sensor (sound, vibration, shock, movement (field disturbance or ultrasonic sensor), motion, or other input). Sensitivity of the complete sensor is adjusted with potentiometer 23 by adjusting the proportionate input voltage going to IC 201. IC 201 is a CMOS device limiting the frequency input capability of the integrated circuit. This limits the frequency of the RF energy that can enter IC 201 through its input circuitry. Capacitor 24 filters low frequency RF energy that may be detected by any of IC 201 input circuitry; therefore, IC 201 eliminates the requirement for having the signal appear, disappear, and then reappear before the sensor will actuate the output. Therefore IC 201 does not include circuitry of the other embodiment which eliminates the DC signal resulting from RF energy feeding into the device.

Resistor 34 establishes a 10 KHz nominal operating frequency of the clock of IC 201. Although IC 201 operates at 5 volts and the maximum operating voltage is 7 volts, the output is protected to 17 volts by stacking the output transistors (not shown) allowing IC 201 to operate in a 12 volt system. Terminal 87 provides a connection for a negative output while triggered on the full alarm output and capacitor 78 provides protection to IC 201 from high voltage transients such as static electricity. LED 69 provides a visual signal of device triggering. In the preferred embodiment it is energized for two seconds. LED 69 will flash at a 5 Hertz rate during a warnaway trigger and is constantly on during the full alarm trigger. The full alarm output signal is negative and the warnaway output is positive. This provides for warnaway output to drive output transistor 65 (required for driving a relay) through base current limiting resistor 67. Transistor 65 then supplies a negative pulse during the warnaway output to output terminal 85. In the preferred embodiment the output pulse is approximately 200 milliseconds for warnaway output and approximately 1.2 seconds for a full alarm output. IC 201 provides both positive and negative voltage outputs to the output terminals as they are required for the application. Another version of this sensor 12 uses two negative outputs from IC 201 to drive alarm inputs directly. The positive output is used to drive a transistor, so that the alarm system can chirp a siren using a relay, with the 200 millisecond warnaway output.

Figure 7:
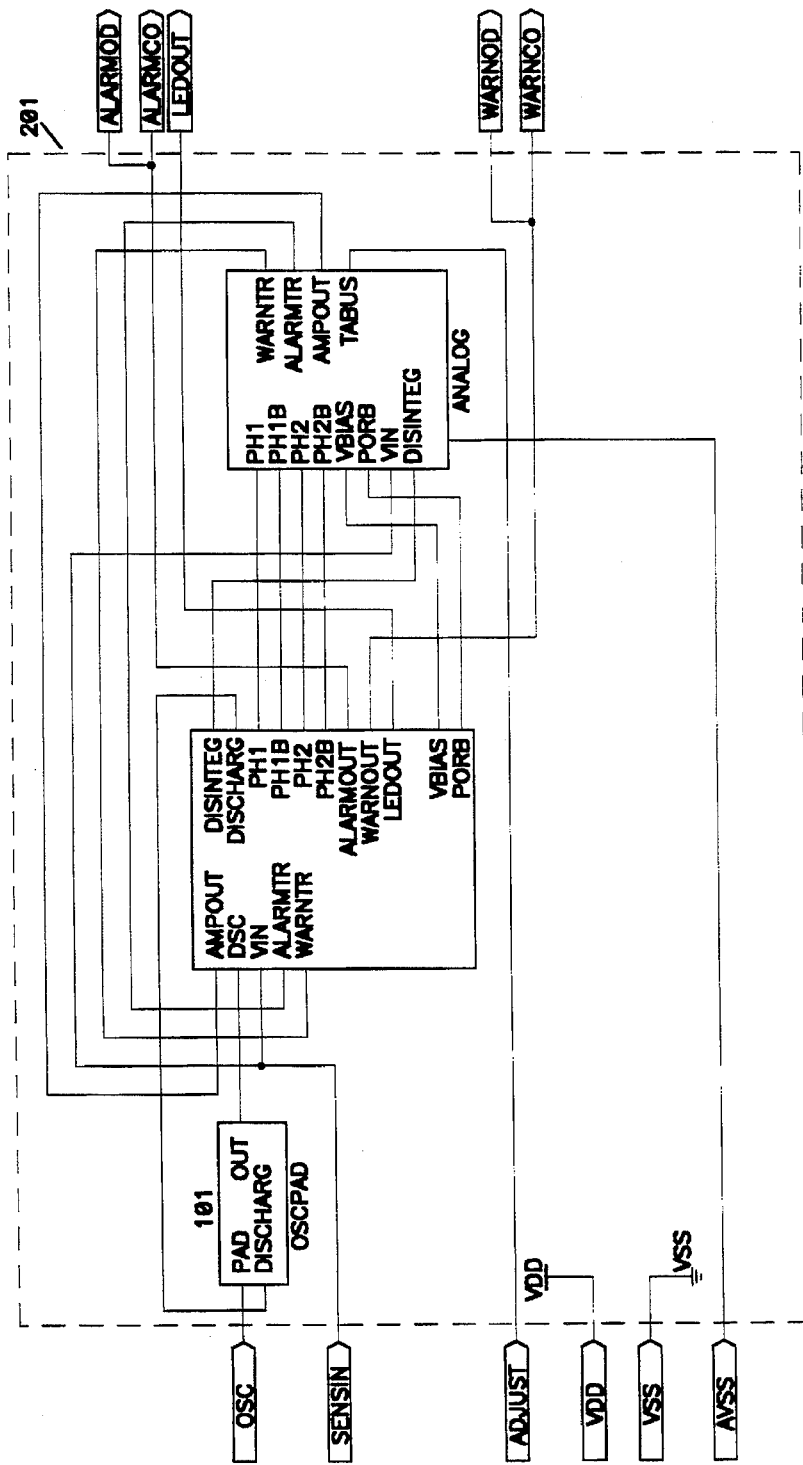
FIG. 7 is a top level block diagram of CMOS Integrated Circuit and its analog and digital sections.

FIG. 7 is a top level block diagram of IC 201 showing its major blocks, digital block 401, analog block 301 and its connection pads. The IC of the preferred embodiment employs eight pins. The logical configuration of this IC has 11 outputs however. Therefore only eight of the eleven pins are brought out in any one configuration. AVSS, the analog ground, is always terminated to VSS, IC 201 ground terminal and its output is not brought out. As stated above, both the full alarm output and the warnaway output have positive and negative pads (pad is an output terminal on the IC chip internal to IC 201), that can be terminated according the requirements of the application. Only one of the full alarm and one of the warnaway alarm outputs are brought out of IC 201.

Figure 8:
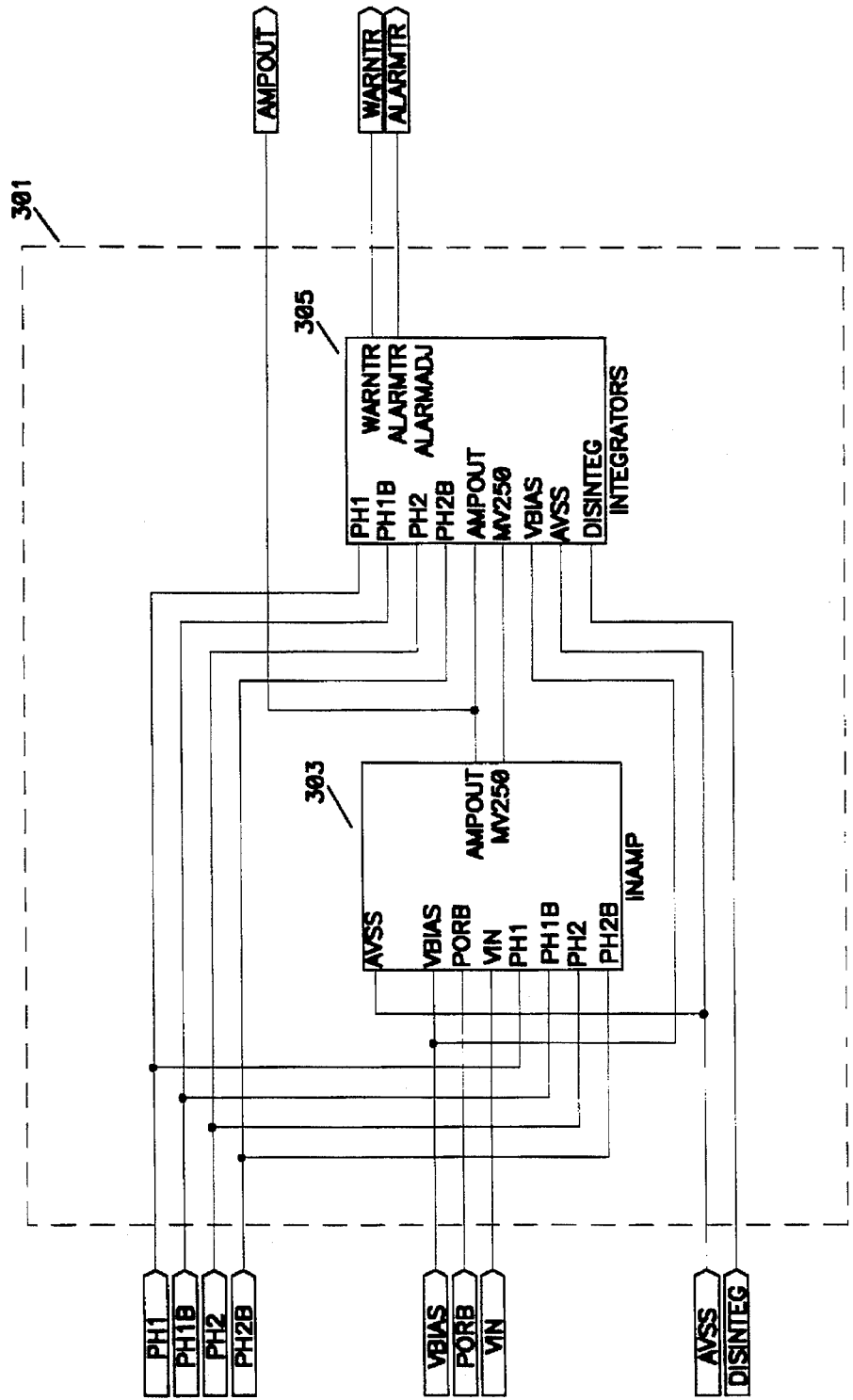
FIG. 8 is an intermediate level block diagram of the analog section, showing the amplifier block and the integrator block.

FIG. 8 is an intermediate level block diagram of analog block 301 showing the major blocks of the analog section of the IC 201, amplifier block 303 and integrator block 305. The basic inputs are shown on the left side and the outputs are shown on the right side of the block diagram. PH1 through PH2B outputs, from the clock of IC 201, drive all the functions of IC 201. VBIAS is a bias for the CMOS analog circuitry of IC 201. PORB is a power on reset (bar or not). VIN is the input signal to amplifier block 303. AVSS is the analog ground reference of IC 201. DISINTEG is a disable the integrator signal from the digital block that uses the amplifier output (AMPOUT) as a clock to initiate the DISINTEG signal. WARNTR is the warnaway trigger output of the warnaway integrator that is used to trigger the timed warnaway output of IC 201. ALARMTR is the full alarm trigger output of the full alarm integrator that is used to trigger the timed full alarm output of IC 201.

Figure 9:
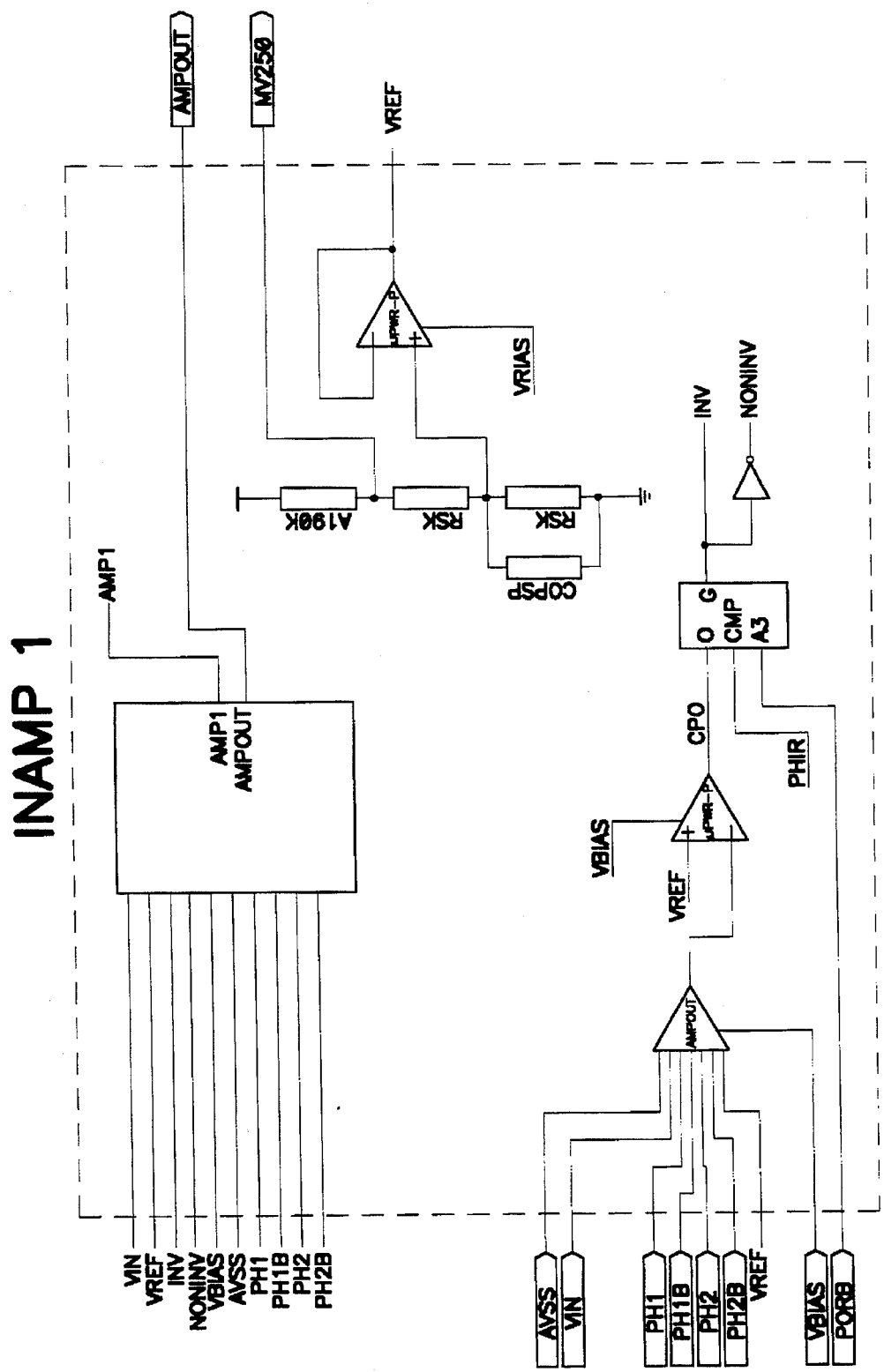
FIG. 9 is a schematic/block diagram of the amplifier block and its inverting/noninverting determination circuitry.

FIG. 9 is a schematic/block diagram of amplifier block 303 showing amplifier 307 block, inverting/noninverting determination circuitry and voltage reference circuitry. The inverting/noninverting circuitry provides outputs to effectively rectify the input signal before it is input to the amplifiers. Amplifier 307 block is described in FIG. 10. VREF is established by a voltage divider made up by 190K ohm resistor 315, 5K ohm resistor 317, and 5K ohm resistor 319. VREF is stabilized by 5 picofarad capacitor 313 and micropower amplifier 321 connected as voltage follower. VREF is at 125 millivolts ((5/200)*5=0.125). The sensor signal is connected to the input of amplifier 309 which uses VREF as a reference voltage. Amplifier 309 is an inverting switching capacitor amplifier with a gain of 40 that uses clock signals PH1 through PH2B to control the switching of the amplifier signals. A similar amplifier is described below during the disclosure of FIG. 10. The output of amplifier 309 is then input to comparator 311, which is referenced to VREF the same as amplifier 309. Therefore any movement of the IC input signal (sensor output signal) away from its zero reference will cause the output of comparator 311 to go to full output polarity of the signal. This is then input to the "D" input of "D-flip-flop" 323. One of the clock signals, PH1B, is used to clock this to output "Q" on the next clock cycle. PORB control signal resets "D-flip-flop" 323 to a low output at power up. A logic high "Q" output is used as a INV control signal and a logic low signal is inverted by inverter 325 and used as the NONINV control signal.

Figure 10:
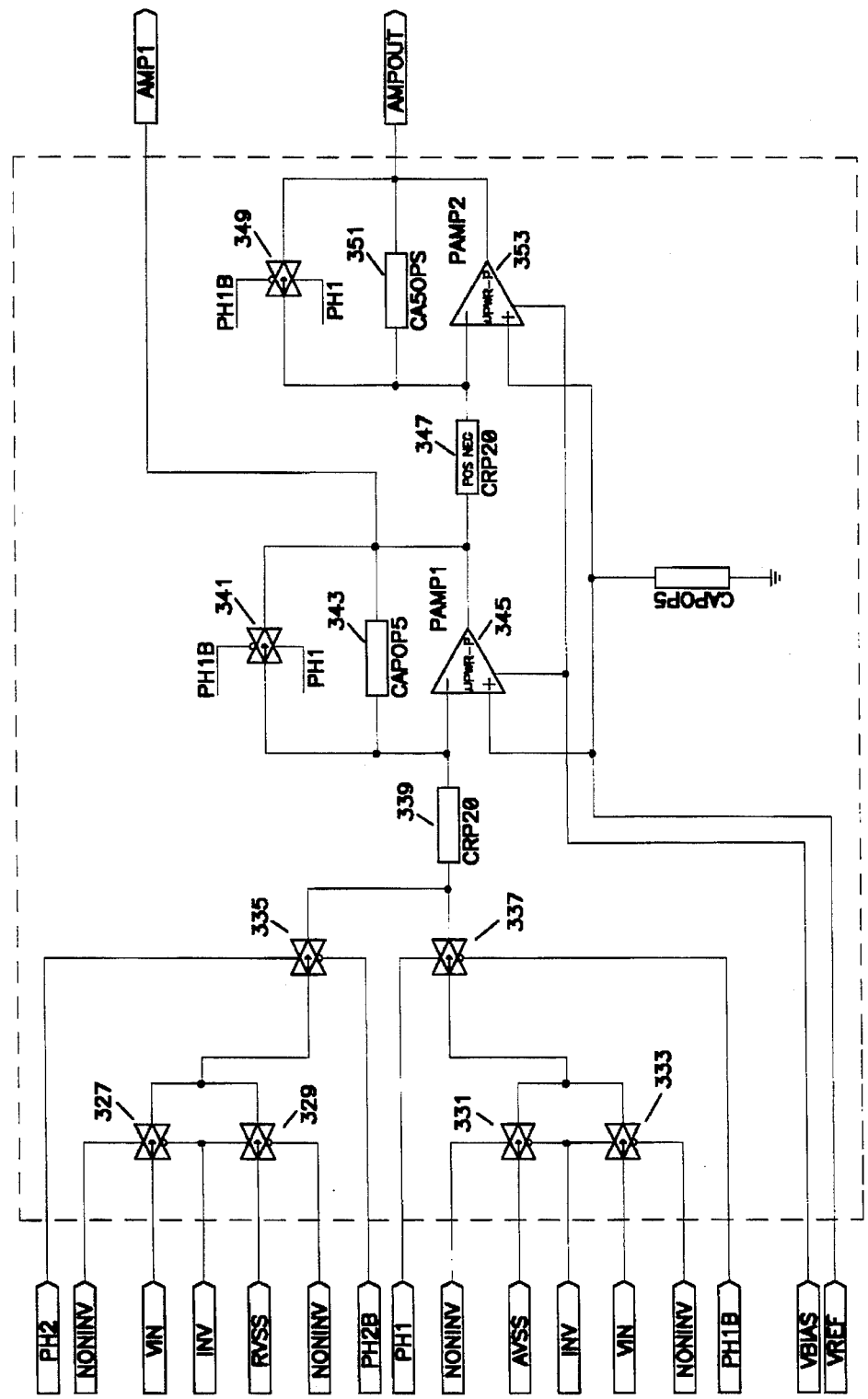
FIG. 10 is a schematic diagram of the amplifier block.

FIG. 10 is a schematic of amplifier 307 block. It is a pair of switching capacitor amplifiers with a total gain of 1600. During phase 1 of the clock (PH1 and PH1B), analog bilateral switch 335 is open and analog bilateral switches 337, 341, and 349 are closed effectively shorting out both amplifiers 345 and 353, and coupling the signal to the input of the amplifier input capacitor 339 through analog bilateral switch 331, if the signal is not inverted (AVSS (ground) is connected), or analog bilateral switch 333 if the signal is inverted (VIN (input signal) is connected). This places ground at the input and output terminals of both amplifiers 345 and 353, if the input is not inverted, or the level of the signal if the input is inverted. The input signal is very small in amplitude, therefore there is not a significant difference at the output of the second amplifier 353 with either ground or the signal connected.

During phase 2 of the clock (PH2 and PH2B), analog bilateral switch 335 is closed and analog bilateral switches 337, 341, and 349 are open. This connects VIN (input signal) to the input of the amplifiers if the signal is not inverted or connects AVSS (ground) if the signal is inverted. This impresses a positive voltage equal to the input signal across input capacitor 339 (20 picofarads) in either case. If the signal is negative it is inverted by first applying the input signal to amplifiers 345 and 353 while they are shorted and then applying ground to input when they are in the amplifying mode (phase 2). This rectifies the signal by always placing a positive signal, with reference to the applied reference that is applied during the none amplifying mode, to the input of amplifier 345 during the amplifying phase (phase 2 of the clock).

Amplifier 345 has a gain of 40 because it will require 40 times the voltage across 0.5 picofarad capacitor 343 to equalize the input voltage across 20 picofarad capacitor 339. The same is true of amplifier 353 and 20 picofarad capacitor 347 and 0.5 picofarad capacitor 351. Amplifiers 345 and 353 are buffered CMOS micropower amplifiers which are known in the art. Capacitor 354 is a 5 picofarad filter capacitor on the 125 millivolt reference input to amplifiers 345 and 353.

Figure 11:
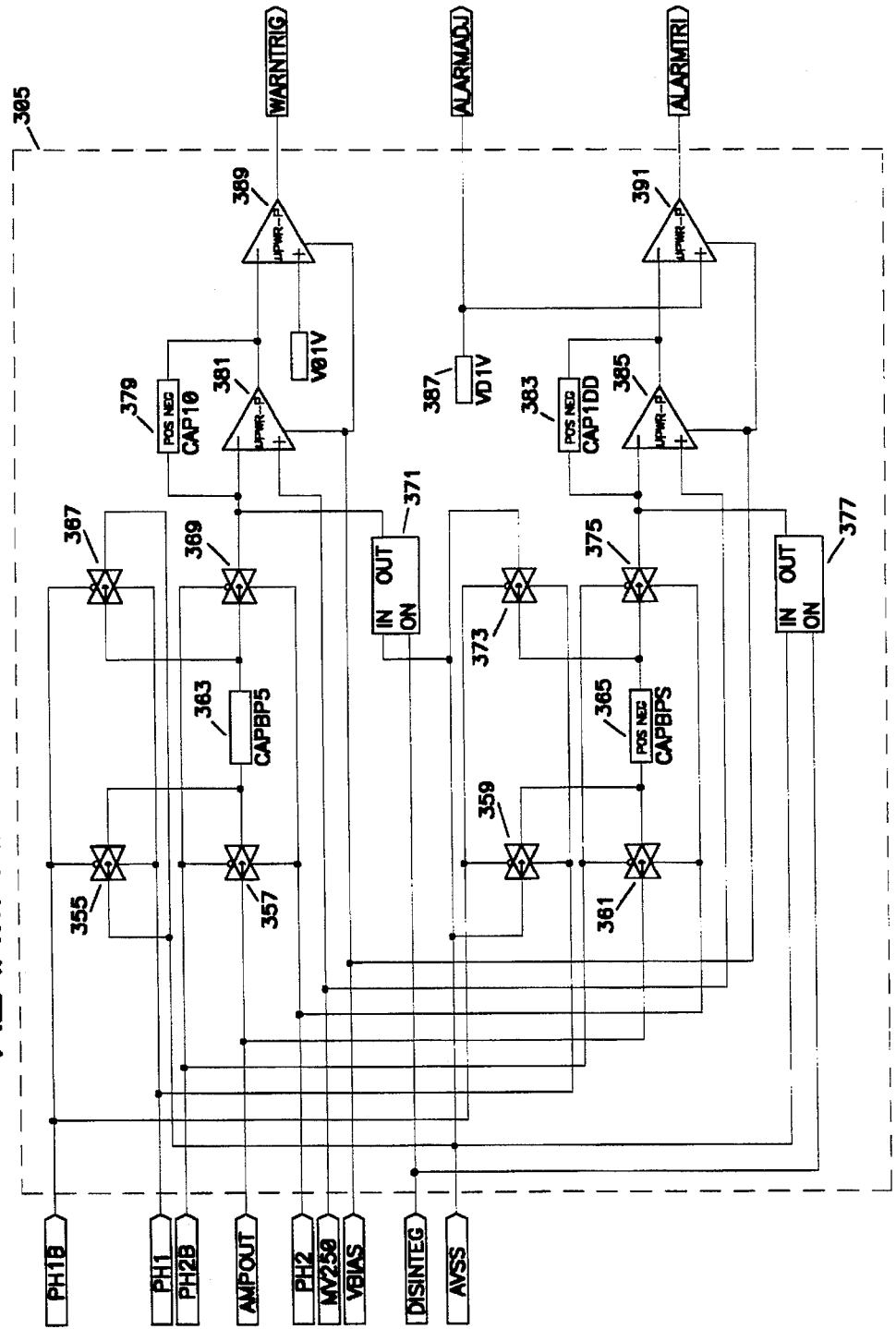
FIG. 11 is a schematic diagram of the warnaway alarm and full alarm switching capacitor integrators and their associated circuitry.

FIG. 11 is a schematic of the warnaway and alarm switching capacitor integrators and their associated circuitry.

If the amplifier output signal (AMPOUT) has a fast enough rise time and is of sufficient amplitude to trigger the disable integrator control circuitry (clock a "D-flip-flop"), it will generate a 5 millisecond integrator disable control signal (DISINTEG). This signal will turn on analog bilateral switches 371 and 377, shorting to ground both the warnaway and full alarm integrator capacitors for 5 milliseconds. This will eliminate the first five milliseconds of any high amplitude fast rise time signal, such as one that would be created by the inrush current in a wire going to an incandescent lamp if the wire is near the inductor of an electromagnetic shock sensor. After five milliseconds, the input is allowed to go to the integrator for integration.

During phase 1 (PH1/PH1B) of the clock input capacitor 363 (0.5 picofarad) of the warnaway integrator is shorted to AVSS (ground) on both ends by analog bilateral switches 355 and 367. Also during phase 1 (PH1/PH1B) of the clock input capacitor 365 (0.5 picofarad) of the full alarm integrator is shorted to AVSS (ground) on both ends by analog bilateral switches 359 and 373. During phase 2 (PH2/PH2B) of the clock, integrator input capacitor 363 is connected to the AMPOUT input signal on one end by analog bilateral switch 357 and to warnaway integrator 381 and its associated integration timing control capacitor 379 (10 picofarads) on the other end by analog bilateral switch 369. Additionally, during phase 2 (PH2/PH2B) of the clock, integrator input capacitor 365 is connected to the AMPOUT input signal on one end by analog bilateral switch 361 and to full alarm integrator 385 and its associated integration timing control capacitor 383 on the other end by analog bilateral switch 375. Warnaway integrator 381 would require 20 dumps (20 full clock cycles (2 milliseconds)) of input capacitor 363 into integrator capacitor 379 to equal the average level of the average input signal level. Full alarm integrator 385 would require 200 dumps (200 full clock cycles (20 milliseconds)) of input capacitor 365 (0.5 picofarads) into integrator capacitor 383 (100 picofarads) to equal the average level of the average input signal level. Voltage divider 387 is composed of two equal size CMOS transistors in series, therefore the output of the divider is equal to one half of the VDD voltage of the IC. If VDD is 5 volts, then the reference for comparators 389 and 391 is 2.5 volts. Therefore with an average amplifier output signal level of 2.5 volts into the integrators, it would take 2 milliseconds for warnaway comparator 389 to generate a warnaway trigger output and 20 milliseconds for full alarm comparator 391 to generate a full alarm trigger output. This is in addition to the 5 milliseconds of integrator hold off, if the rise time of the input signal is fast enough and high enough to trigger the disable integrator control signal.

Figure 12:
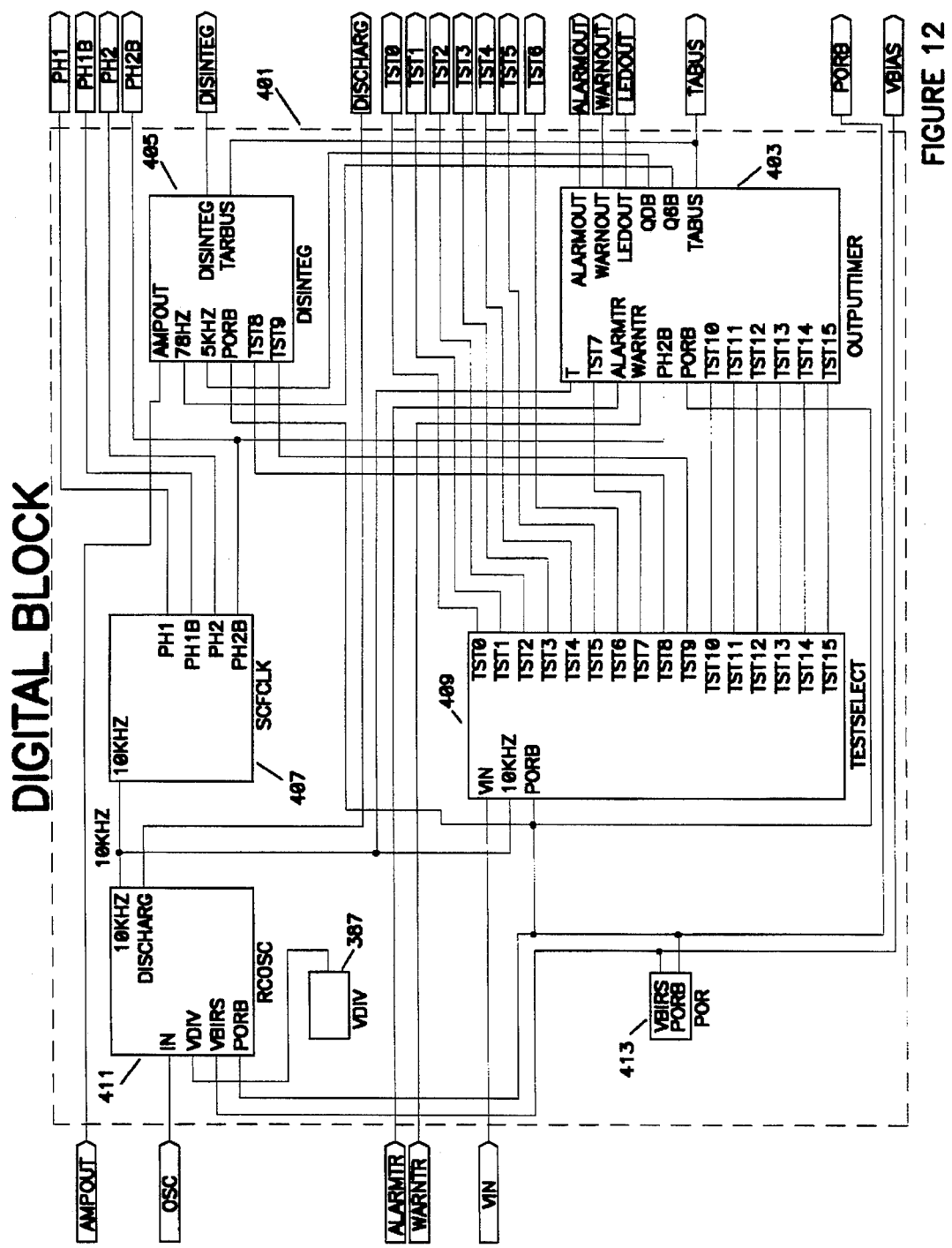
FIG. 12 is an intermediate level block diagram of digital section, showing its major blocks therein.

FIG. 12 is an intermediate level block diagram of digital block 401 showing the major blocks of the digital section of the IC, output timer block 403, disable integrator block 405, clock pulse phase circuitry 407, test select 409, RC oscillator 411, power on reset and bias generator 413, and voltage divider 387 disclosed above in the FIG. 11 (integrators). The power on reset and bias generator 413 is a group of transistors and one capacitor that generates a reset at power up and establishes a bias for all the analog amplifiers etc. Resistor capacitor (RC) oscillator 411 has all components on board including a 15 picofarad capacitor, with the exception of the timing resistor, which is external to IC 201. It is a conventional CMOS RC oscillator with a divide by two circuit ("T-flip-flop") to produce a 10 Khz clock form a 20 Khz oscillator. Clock pulse phase circuitry 407 has pulse separation delay circuitry and inverters for both phases of the clock. Test select circuitry 409 selects internal circuits for testing and accelerates the clock for the timers to reduce testing time of the IC. Test is initiated by pulling the input terminal up to VDD and the readings are taken on the adjust terminal.

Figure 13:
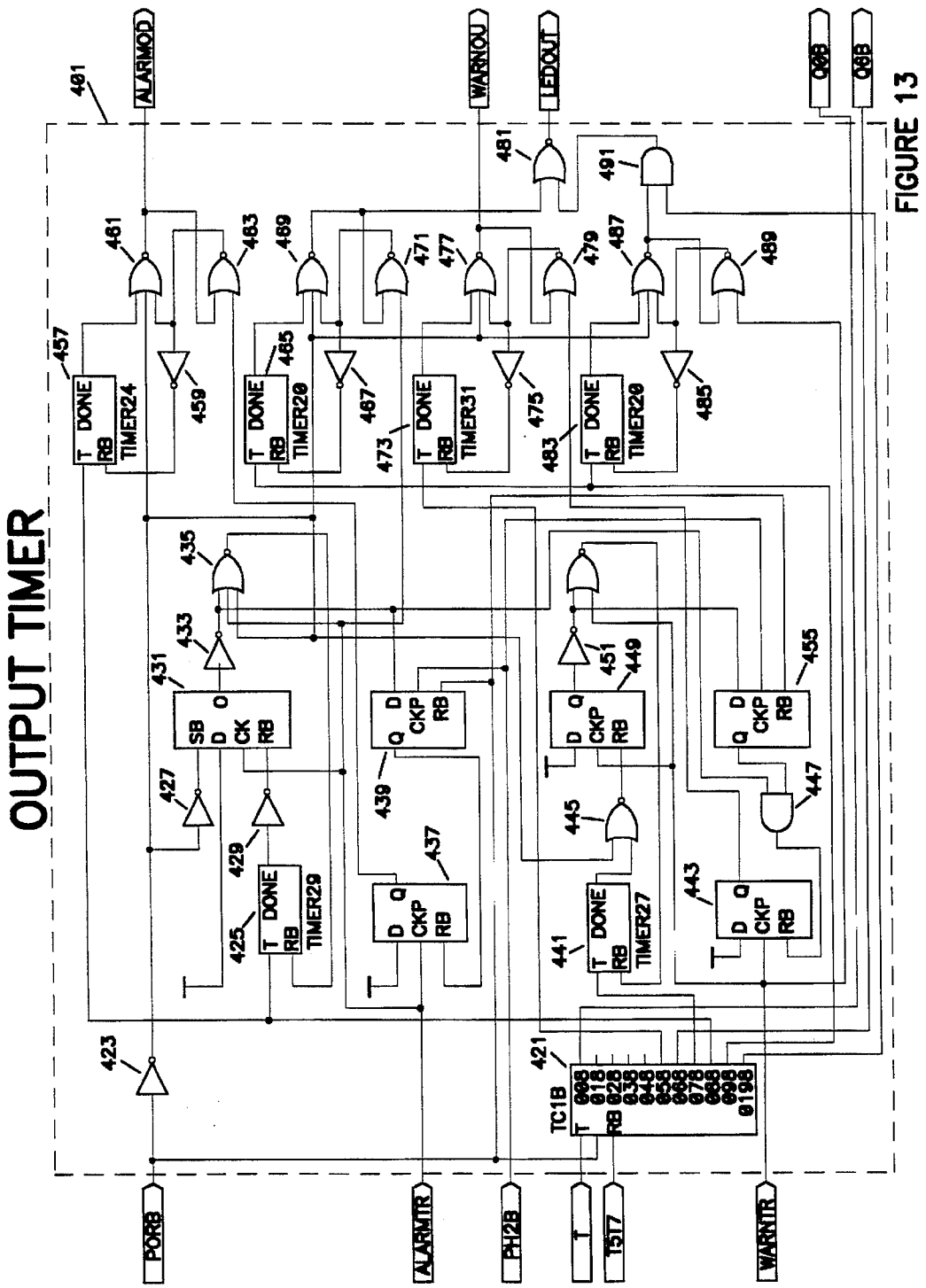
FIG. 13 is a schematic of output timer block having six timer blocks, timer clock divider block and the associated circuitry required to support the timing of the IC.

FIG. 13 is a schematic of output timer block 403. It contains six timer blocks, timer clock divider block 421, and the associated circuitry required to support the output timing of IC 201. The six timers include five divider stages with resets and output determination circuitry. Timer clock divider block 421 has eleven divider stages with resets and a test mode bypass for the first 5 stages to accelerate testing. One of the eleven outputs is used as required for the input clocks to the 6 timers above.

Inverter 423 inverts the negative power on reset (PORB), which is inverted again by inverter 427 before being input to set "D-flip-flop" 431 "Q" output on (high). This starts 1.5 second full alarm disable timer 425 at power up via inverter 433 which inverts the signal to a low, which allows the output of "nor gate" 435 to go high, thereby removing the reset from the timer allowing it to start. When disable timer 425 starts, its done output remains low, which is inverted by inverter 429, thereby continuing to hold the reset off "D-flip-flop" 431, allowing the "Q" output to remain high for the timing cycle of disable timer 425. One and a half second disable timer 425 has a count of 29 with an input clock of 19.53 Hertz, which gives a time of 1.485 seconds, which is very close to the chosen nominal time of 1.5 seconds (1% off). The high "Q" output from "D-flip-flop" 431 is inverted by inverter 433 and used to disable any input from either the warnaway or full alarm integrators. This is done for the full alarm input, by setting the "D" input to "D-flip-flop" 439 low, with the output from inverter 433. This on the next 10 KHz clock cycle sets "D-flip-flop" 439 "Q" output low and holds "D-flip-flop" 437 in reset, thereby not allowing the full alarm input to be clocked through to its output timer 457 for the duration of disable timer 425 timing cycle. For the warnaway input, by setting one of the inputs to AND gate 447 low, forcing AND gate 447 output low disabling "D-flip-flop" 443 by holding it in reset and not allowing the warnaway input to be clocked through to its output timer 473 for the duration of disable timer 425 timing cycle. Full alarm disable timer 425 blocks both warnaway and full alarm inputs.

The positive inverted power on reset (PORB) is also used to reset all other timers. After reset, the alarm trigger input from the full alarm integrator (it triggers at power up) starts two second timer 465 of LED 69, but is blocked from starting full alarm output timer 457 by disable timer 425 holding "D-flip-flop" 437 in reset. Also after reset, the warnaway trigger input from the warnaway integrator (it triggers at power up also) triggers two second warnaway flash timer 483, but is also blocked from triggering warnaway output timer 473 by disable timer 425 holding "D-flip-flop" 443 in reset.

After the 1.5 second period at power on reset, an input from either the full alarm or warnaway integrators will trigger its associated output timers and input disable timer (s). An input from the full alarm integrator will trigger: disable timer 425, full alarm output timer 465 for LED 69, and full alarm output timer 457.

When the trigger is released, alarm disable timer 425 will run its full duration as described above. Full alarm output timer 465 for LED 69 is triggered by setting "RS latch" made up with "nor gates" 469 and 471, then through inverter 467 to release the reset on timer 465 allowing it to start. This will drive LED 69 output continuously for the full duration of the timing cycle through "nor gate" 469 and "or gate" 481 for the duration of timer 465. When timer 465 expires, it resets "RS latch" made up with "nor gates" 469 and 471, which holds the timer in reset and LED 69 off until the input is triggered again. Full alarm output timer 457 is triggered through clocking "D-flip-flop" 437 which transfers the high "D" input to the "Q" output. This sets "RS" latch made up with "nor gates" 461 and 463. The low output from "nor gate" 463 goes to inverter 459 to release the reset on timer 457 allowing it to start. When it starts, it drives the full alarm output through "nor gate" 461 for the full duration of the timing cycle. At the end of the timing cycle, the output of the timer resets "RS latch" made up with "nor gates" 461 and 463, which holds timer 457 in reset and full alarm output off until the full alarm output timer 457 is again triggered by an input from the full alarm integrator.

The warnaway trigger input from the warnaway integrator (shown in FIG. 11) will trigger the following timers of output timer block 403: warnaway disable timer 441 (700 milliseconds in the preferred embodiment), warnaway flash timer 483 for LED 69 (two seconds in the preferred embodiment), and warnaway output timer 473 (200 milliseconds in the preferred embodiment). Warnaway flash timer for LED 69 is started any time the warnaway trigger input is received. The input signal sets "RS latch" made up of "nor gates" 487 and 489. The low output from "nor gate" 489 is inverted by inverter 485. The high signal at the reset input of timer 483 releases the reset and allows timer 483 to start. The low output of timer 483 allows the output of "nor gate" 487 to go high for the duration of the timing cycle. This output is AND-ed with a 5 Hertz clock signal from clock timer 421 by AND gate 491, which will give a 5 Hertz output pulse string for a period of 2 seconds. The 5 Hertz signal is input into "or gate" 481 to drive LED 69 output with the 5 Hertz pulse string for the 2 second period. Hence, LED 69 flashes at a 5 Hertz rate for 2 seconds. A constant 2 second on (high) signal from full alarm output timer 465 of LED 69 will keep LED 69 on constant if it is input to "or gate" 481 at the same time as the 2 second 5 Hertz pulse string is input.

Warnaway output timer 473 is started by the warnaway input from the warnaway integrator clocking the high "D" input to the output. The high "Q" output sets "RS latch" made up of "nor gates" 477 and 479. Then the low output of "nor gate" 479 is inverted by inverter 475, applying a high to the reset input of timer 473. This releases the reset, which allows the timer to start. When warnaway output timer 473 starts, the output goes low, applying a low to one of the inputs of "nor gate" 477. This allows the output to go high, which provides a positive signal to drive the warnaway output, which can either be inverted or not inverted at the output terminal.

The warnaway trigger input clocks the high "D" input of "D-flip-flop" 449 to the "Q" output, the high "Q" output is inverted by inverter 451, providing a low to one of the inputs of "nor gate" 453. This is blocked from releasing the reset on timer 441 by the high warnaway trigger input being high, until the trigger input goes away, at which time warnaway disable timer 441 is started. When timer 441 starts, its output remains low for the duration of the timing cycle. This low output is inverted to a high to continue to hold the reset off on reset input of "D-flip-flop" 449 (it is a negative input for reset). The low output of inverter 451 also goes to the "D" input of "D-flip-flop" 455 which is toggled (transferred) to the "Q" output on the next 10 KHz clock cycle. The low "Q" output of "D-flip-flop" 455 goes to one of the inputs of AND gate 447 forcing its output to go low thereby placing a reset on "D-flip-flop" 443. This blocks any warnaway trigger input to warnaway output timer 473, but does not block a full alarm input, for the duration of the warnaway disable timer 441. When timer 441 times out, its output goes high, producing a low at the output of "nor gate" 445. This resets "D-flip-flop" 449, causing its "Q" output to go low. The low at the "Q" output is inverted by inverter 451, releasing the warnaway trigger input by removing the reset from "D-flip-flop" 443 on the next 10 KHz clock cycle via "D-flip-flop" 455 and AND gate 447. This high at the output of inverter 451 is input to "nor gate" 453 forcing its output to go low. This places a reset on warnaway disable timer 441, forcing its output low. The low at the output of timer 441 is input to "nor gate" 445 allowing its output to go high. This releases the reset on "D-flip-flop" 449, making it available for another warnaway input trigger.

If a warnaway or full alarm input trigger is received while their respective disable timers are running, then that timer is reset by the positive input of the trigger via their respective "nor gates" 435 or 453 (inverts the signal and resets the timer). When the input trigger is removed, the reset is removed allowing the respective timer to start a new timing cycle. Therefore, as long as an activating input is present at the input of IC 201, the respective timer will be held in reset and if the signal goes away and returns within the respective disable timer timing cycle, it will be blocked from generating an output and it will reset and restart the respective disable timer when the signal disappears again.

Figure 14:
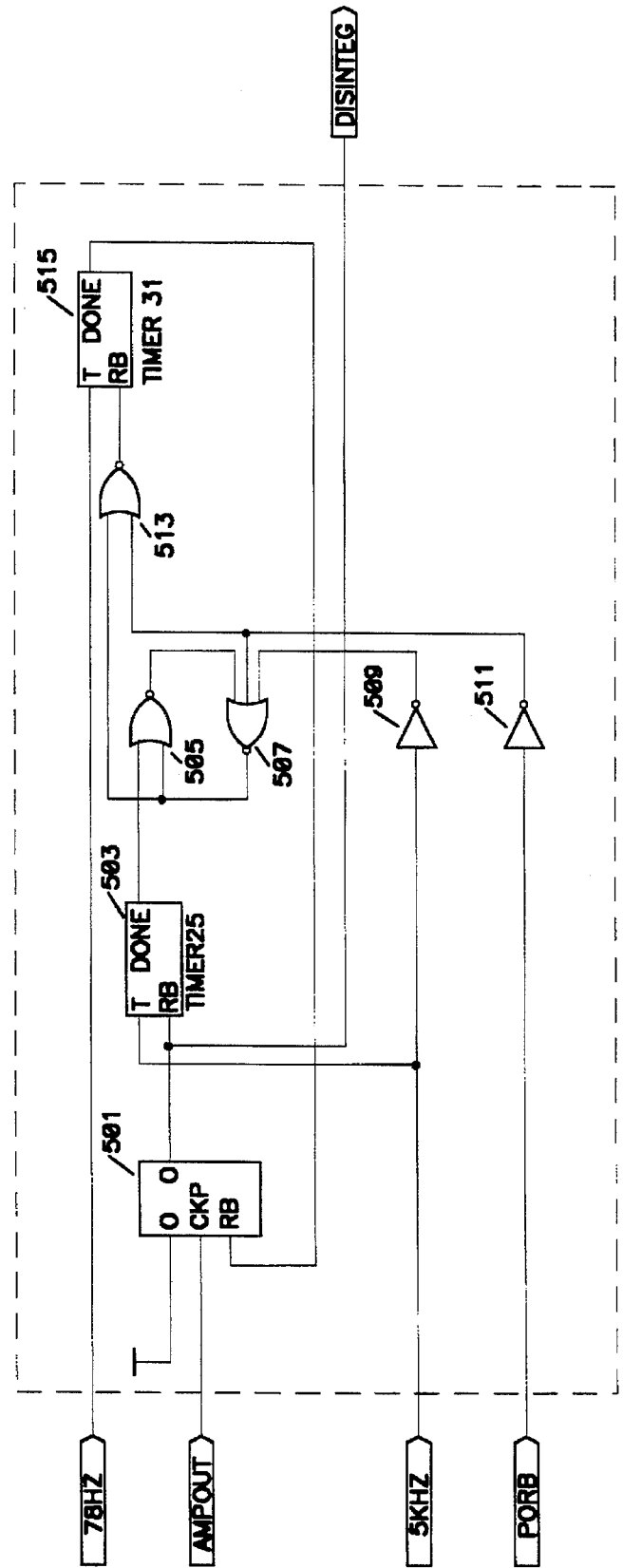
FIG. 14 is a schematic of the integrator disable control circuit.

FIG. 14 is a schematic of the integrator disable control circuit. If during an input, the input rises fast enough and has sufficient amplitude, the AMPOUT (amplifier output) signal will clock the high at "D-flip-flop" 501 "D" input to its "Q" output. This will release the reset on five millisecond integrator disable timer 503, allowing it to start. At the same time the high "Q" output is used to disable both warnaway and full alarm integrators 305 (discussed above). When integrator disable timer completes it cycle, its output goes high setting "RS latch" made up of "nor gates" 505 and 507. When the "RS latch" is set, a high out of "nor gate" 507 goes to "nor gate" 513, forcing its output to go low, resetting integration minimum time timer 515. One half of a 5 KHz clock cycle later (the Clock is inverted by inverter 509), a high input to "nor gate" 507 resets the "RS latch" and forces "nor gate" 507 output low, allowing the output of "nor gate" 513 to go high thereby releasing timer 515 to start its timing cycle. When integration minimum time timer 515 is reset or is in its timing cycle, its output is low, placing a reset on "D-flip-flop" 501 and disabling any additional integrator disable output for the duration of the reset and the timer's timing cycle, which is 400 milliseconds. PORB (power on reset bar or not) is inverted by inverter 511. The high reset signal out of inverter 511 then resets the "RS" latch and integration minimum time timer 515, starting a 400 millisecond timing cycle at power on reset.

Figure 15:
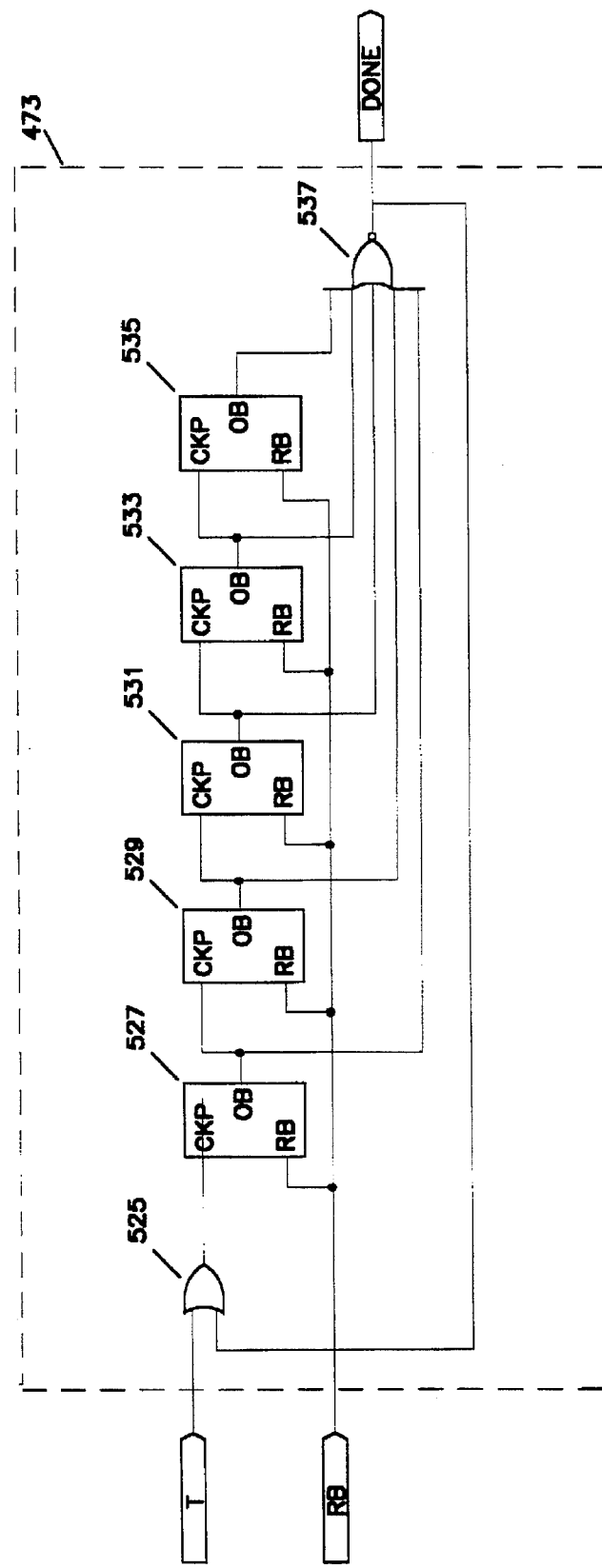
FIG. 15 is a schematic of one of the five stage "T-flip-flop" timers that is used in IC.

FIG. 15 is a schematic of one of the 5 stage "T-flip-flop" timers that is used in IC 201. Any number of clock cycles can be used in these timers up to 31 ($2^5-1$), which is the number that is used in the FIG. 15 schematic. Unless the timing hits right on for a low count, it is preferable to use a higher count for better accuracy in the timing which provides for higher resolution. The 5 stage timers can use any output from clock divider timer 421. Warnaway output timer 473 with its 5 stage timing using a 5 KHz clock from divider timer 421 would have a time-out or a complete cycle of 6.2 milliseconds, while using a 5 Hertz output would have a time-out of 6.35 seconds.

Warnaway output timer 473, using a 156.25 Hertz clock input at the "T" input would have a 198.4 milliseconds time-out (within 1% of the nominal 200 milliseconds chosen). When the RB (reset bar) input is low, the timer is held off with all of the QB's ("Q" bars) high. When the reset is released and a clock signal is input at the "T" input to "or gate" 525, the output of "or gate" 525 will follow the clock until "done" goes high forcing "or gate" 525 to remain high as long as "done" is high, thereby stopping and holding the count at 31 until the timer is reset and released from reset. Each "T-flip-flop" stage divides the clock by 2. After "T-flip-flop" 527, the clock frequency would be 78.125 Hertz. After "T-flip-flop" 529, the clock frequency would be 39.0625 Hertz. After "T-flip-flop" 531, the clock frequency would be 19.53125 Hertz. After "T-flip-flop" 533, the clock frequency would be 9.765625 Hertz. After the last stage "T-flip-flop" 535 the clock frequency would be 4.8828125 Hertz if the counter would continue to run, but when all of the "QB" outputs go low, all the inputs to "nor gate" 537 are low, thereby allowing the "done" output to go high which blocks the clock input and stops counter/timer with a count of 31. It will remain stopped until the timer is reset and the reset is released.

Also this unit is described as a 2-stage sensor, but the invention is not limited to 2 stages and may be employed with three (3) or more stages (where a stage is level of threat input generating a predetermined alarm response). The output pulses may vary in lengths such as 200 milliseconds for the "warn-away" and approximately one full second for the full alarm output. This will allow alarms with the capability to distinguish between "warn-away" and full alarm with one input. This also provides for elimination of one drive transistor and one wire.

The above disclosure makes reference to component values and to time values. This is provided to aid the reader in reconstruction and understanding of the circuit. However, it is not limiting to the invention. A number of values may be employed to achieve the same or substantially the same result and to vary the parameters of the application.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A method of indicating a degree of incoming threat to an electronically secured area comprising the steps of:
   a) sensing via a sensor means a degree of threat delivered to a secured area;
   b) generating from the output of said means an electric signal proportional to said degree of threat;
   c) analyzing said signal to determine if it represents a low degree of threat or a high degree of threat; and
   d) producing either a first pulse representing said low degree of threat or separately producing said first pulse and a second pulse representing a signal having both said low degree of threat and said high degree of threat.

2. The method of claim 1 wherein said sensor means is chosen from a group consisting of shock sensors, motion sensors, field disturbance sensors, sound discriminator sensors, ultrasonic sensors and current sensors.

3. The method of claim 2 wherein the step of generating said electric signal includes the step of generating an alternating current signal whose amplitude is proportional to said degree of threat.

4. The method of claim 2 wherein the step of analyzing said signal includes the steps of:
   a) amplifying said signal to produce an amplified signal;
   b) impressing said amplified signal simultaneously to at least two separate integrators of different sensitivity to produce integrated signals; and
   c) activating a pulse generator specific to each said integrated signal if the associated integrated signal reaches a predetermined level.

5. The method of claim 4 wherein the step of analyzing said signal further includes the steps of:
   a) impressing said integrated signals simultaneously to respective comparators of different sensitivity to produce a first comparator signal if the associated integrated signal reaches a first predetermined level indicating said low degree of threat signal or a second comparator signal if the associated integrated signal reaches a second, higher predetermined level indicating said high degree of threat signal; and
   b) activating a pulse generator specific to said first and said second comparator signals.

6. The method of claim 2 wherein the step of analyzing said signal includes the steps of:
   a) amplifying said signal to produce an amplified signal;
   b) impressing said amplified signal simultaneously to at least two separate integrators/comparators, each said integrator/comparator having different sensitivity; and
   c) activating a pulse generator to produce said first and said second pulses specific to each signal integrated and compared if that signal reaches an associated predetermined level.

7. The method of claim 2 wherein said step of analyzing said signal includes the steps of:
   a) amplifying said signal with an amplifier to produce an amplified signal;
   b) impressing said amplified signal simultaneously to at least two separate integrators of different sensitivity to produce integrated amplified signals;
   c) separately impressing said integrated, amplified signals to at least two signal comparators, one in series with each integrator and of different sensitivity, to provide a first comparator signal indicating said low degree of threat or a second comparator signal indicating said high degree of threat if the integrated, amplified signal reaches an associated predetermined level; and
   d) activating a pulse generator specific to each said comparator signal.

8. The method of claim 2 including the additional step of ignoring said signal produced by said sensor means for a predetermined amount of time to eliminate spurious, nonphysical signals interacting with said sensor means.

9. The method of claim 8 wherein the step of ignoring said signal includes the step of opening a normally closed switch to disconnect said amplified signal, for said predetermined amount of time to eliminate spurious, nonphysical signals produced by random energy fields interacting with said sensor means.

10. The method of claim 8 wherein the step of ignoring said signal for said predetermined amount of time includes the step of opening a pair of normally closed switches for preventing second pulses from being output to an alarm controller to eliminate signals produced by continuous energy fields interacting with said sensor means.

11. The method of claim 8 wherein the step of ignoring said signal for said predetermined amount of time includes the step of resetting a flip-flop having an output therein and generating a logic low output for preventing the production of said first and said second pulses to eliminate signals produced by continuous energy fields interacting with said sensor means.

12. The method of claim 8 wherein said nonphysical signals include an EMF signal or an RF signal.

13. The method of claim 1 including the additional step of ignoring any signal that does not disappear and later reappear.

14. The method of claim 13 wherein said step of ignoring a signal that does not disappear and later reappear includes the steps of triggering a first or second timer to generate a third or a fourth pulse for opening a respective normally closed switch to prevent providing said first or second pulses to an alarm controller.

15. The method of claim 14 wherein said step of ignoring a signal that does not disappear and later reappear includes the steps of triggering said first or said second timer to generate said third or said fourth pulses for opening of respective normally closed switches to prevent providing said first or second pulses to said alarm controller for the duration of said threat delivered to said secured area.

16. The method of claim 1 further including the step of sending said pulses over a single conductor to an alarm controller.

17. The method of claim 16 wherein said alarm system controller recognizes said pulses by their associated pulse-width as either a full alarm threat or a warn-away threat.

18. An electronic security system for indicating a degree of threat incoming to an electronically secured area comprising:
   a) sensor means for sensing a degree of threat delivered to a protected area;
   b) means for generating an electric signal proportional to said degree of threat;
   c) means for analyzing said electric signal to determine if it represents a low degree of threat or a high degree of threat; and
   d) means for producing either a first pulse, representing said low degree of threat, or means for separately producing said first pulse and a second pulse, representing said signal having both said low degree of threat and said high degree of threat.

19. The device of claim 18 wherein said sensor means is chosen from a group consisting of shock sensors, motion sensors, field disturbance sensors, sound discriminator sensors, ultrasonic sensors and current sensors.

20. The device of claim 19 further including means for ignoring said signal produced by said sensor means for a predetermined amount of time to eliminate spurious, nonphysical signals.

21. The device of claim 20 wherein the means for ignoring said signal includes a normally closed switch which is opened for said predetermined amount of time for disconnecting said signal to thereby eliminate spurious, nonphysical signals produced by random energy fields interacting with said sensor means.

22. The device of claim 20 wherein means for ignoring said signal includes a pair of normally closed switches for preventing providing said first and said second pulses for said predetermined amount of time to an alarm controller to eliminate signals produced by continuous energy fields interacting with said sensor means.

23. The device of claim 20 wherein means for ignoring said signal includes a flip-flop having an output therein for generating a logic low output for preventing providing said first and said second pulses for said predetermined amount of time to an alarm controller for eliminating signals produced by continuous energy fields interacting with said sensor means.

24. The device of claim 20 wherein said nonphysical signals include an EMF signal or an RF signal.

25. The device of claim 18 further including means for ignoring any signal that does not disappear and later reappear.

26. The device of claim 25 wherein said means for ignoring a signal that does not disappear and later reappear includes a first or second timer for generating a third or a fourth pulse for opening respective normally closed switches to prevent providing said first or second pulses to an alarm controller.

27. The device of claim 26 wherein said means for ignoring a signal that does not disappear and later reappear triggers said first or said second timer to generate said third or said fourth pulses for opening said normally closed switches to prevent providing said first or second pulses to said alarm controller for the duration of said threat delivered to said secured area.

28. The device of claim 18 further including a single conductor sending said first and second pulses to an alarm controller.

29. The device of claim 28 further including an alarm system controller for recognizing said pulses by their associated pulsewidth as either a full alarm threat or a warn-away threat.

30. The device of claim 18 further including a capacitor through which said signal is passed to remove any direct current and voltage therefrom.

31. The device of claim 18 wherein said means for analyzing said signal includes:
a) a signal amplifier, having an input and an output therein, for receiving said signal from said sensor means and producing an amplified signal thereof; and
b) a first and second voltage integrator connected to said amplifier output, said first integrator having a high sensitivity for responding to said low degree of threat signal and said second integrator having a lower sensitivity for responding to said high degree of threat signal, said integrators simultaneously receiving said amplified signal from said amplifier.

32. The device of claim 18 wherein said means for analyzing said signal includes:
a) a signal amplifier, having an input and an output therein, for receiving said signal from said sensor means and producing an amplified signal thereof; and
b) a pair of voltage comparators connected to said amplifier output, said first comparator having a high sensitivity for responding to said low degree of threat signal and said second comparator having a lower sensitivity for responding to said high degree of threat signal, said comparators simultaneously receiving said amplified signal from said amplifier.

33. The device of claim 18 wherein said means for analyzing said signal includes:
a) a signal amplifier, having an input and an output therein, for receiving said signal from said sensor means and producing an amplified signal thereof; and
b) a first and second voltage integrator and comparator connected to said amplifier output, said first integrator-comparator having a high sensitivity for responding to said low degree of threat signal and second said integrator-comparator having a lower sensitivity for responding to said high degree of threat signal said integrators and comparators simultaneously receiving said amplified signal from said amplifier.

34. The device of claim 18 wherein said means for producing either said first pulse or said separate first and second pulses includes a first and second voltage comparator/output-pulse-generator, each connected to a respective voltage integrator for comparing integrated voltages produced from each said integrator and producing said first pulse representing said low degree of threat signal from a high sensitivity integrator and separately producing both said first and said second pulse representing said low degree of threat signal from said high sensitivity integrator and said high degree of threat signal from a low sensitivity integrator.

35. The device of claim 34 further including a single conductor coupled to outputs of said pulse generators for transmission of said first and said second pulses having different pulsewidths.

36. The device of claim 18 further including a single conductor for transmission of said first and said second pulse therethrough.

37. The device of claim 18 wherein said first and said second pulses have a first and a second pulsewidth.

38. The device of claim 37 wherein said first pulsewidth is greater then said second pulsewidth or said second pulsewidth is greater then said first pulsewidth.

39. A method of blocking undesirable signals from activation of an alarm in an electronically secured area comprising the steps of:
a) sensing via a sensor means a degree of threat delivered to a protected area;
b) generating from the output of said sensor means an electric signal, having strength proportional to said degree of threat;
c) amplifying said signal to produce an amplified signal;
d) deleting the front end of said amplified signal and removing it from further consideration;
e) inputting said amplified signal to a comparator for comparing said amplified signal against a known reference;
f) producing in response to said comparison either a first pulse, representing a low degree of threat, or separately producing said first pulse and a second pulse, representing a signal having both said low degree of threat and a high degree of threat; and
g) simultaneously preventing the output of either said separate first and second pulses or said first pulse to an alarm until said amplified signal disappears and later reappears.

40. The method of claim 39 wherein said sensor means is chosen from a group consisting of shock sensors, motion sensors, field disturbance sensors, sound discriminator sensors, ultrasonic sensors and current sensors.

41. The method of claim 40 wherein the step of amplifying said signal includes the additional steps of amplifying and rectifying a full wave of said signal so that said amplified signal represents all values of said signal, is solely positive, and reduces the differential in the positive and negative aspects of said signal.

42. The method of claim 40 including the additional step of ignoring said signal produced by said sensor means for a predetermined amount of time to eliminate spurious, nonphysical signals interacting with said sensor means.

43. The method of claim 42 wherein the step of ignoring said signal includes the step of opening a normally closed switch to disconnect said amplified signal, for said predetermined amount of time, to eliminate spurious, nonphysical signals produced by random energy fields interacting with said sensor means.

44. The method of claim 42 wherein the step of ignoring said signal for said predetermined amount of time includes the step of opening a pair of normally closed switches to prevent said first and second pulses from being output to an alarm controller to eliminate signals produced by continuous energy fields interacting with said sensor means.

45. The method of claim 42 wherein the step of ignoring said signal for said predetermined amount of time includes the step of resetting a flip-flop having an output therein and generating a logic low output for preventing production of said first and said second pulses to eliminate signals produced by continuous energy fields interacting with said sensor means.

46. The method of claim 42 wherein said nonphysical signals include an EMF signal or an RF signal.

47. The method of claim 40 further including the step of ignoring any signal that does not disappear and later reappear.

48. The method of claim 47 wherein said step of ignoring a signal that does not disappear and later reappear includes triggering a first or second timer to generate a third or a fourth pulse for opening of an associated normally closed switch to thereby prevent said first or second pulses from being output to an alarm controller.

49. The method of claim 48 wherein said step of ignoring a signal that does not disappear and later reappear includes the steps of triggering said first or said second timer to generate said third or said fourth pulses for opening of said normally closed switches to thereby prevent said first or second pulses from being output to said alarm controller for the duration of said threat delivered to said secured area.

50. The method of claim 39 employing a single conductor for transmission of said first and said second pulse therethrough.

51. The method of claim 39 employing a single conductor coupled to outputs of a pair of pulse generators generating said first and second pulses for transmission of said first and said second pulses having different pulsewidths.

52. The method of claim 39 wherein said first and said second pulses have a first and a second pulsewidth.

53. The method of claim 52 wherein said first pulsewidth is greater then said second pulsewidth or said second pulsewidth is greater then said first pulsewidth.

54. A method of indicating a degree of an incoming threat to an electronically secured area comprising the steps of:
  a) sensing via a sensor means a degree of threat delivered to an electronically secured area including the step of generating an alternating current signal whose amplitude is proportional to said degree of threat;
  b) analyzing said signal to determine if it is of a low, degree of threat or of a high degree of threat, including the steps of:
    i) rectifying and amplifying said signal;
    ii) impressing the resulting rectified, amplified signal simultaneously to at least two separate integrators of different sensitivity;
    iii) impressing the resulting separate integrated, amplified signals to at least two signal comparators of different sensitivity, one in series with each of said integrators; and
    iv) activating at least one pulse generator responsive to an output of each said signal comparator; and
  d) producing either a first pulse representing said low degree of threat or separately producing said first and a second pulse representing a signal having both said low degree and said high degree of threat.

55. The method of claim 54 wherein said sensor means is chosen from a group consisting of shock sensors, motion sensors, field disturbance sensors, sound discriminator sensors, ultrasonic sensors and current sensors.

56. The method of claim 54 including the additional step of ignoring said signal produced by said sensor means for a predetermined amount of time to eliminate spurious, nonphysical signals interacting with said sensor means.

57. The method of claim 56 wherein the step of ignoring said signal includes the step of opening a normally closed switch to disconnect said amplified signal, for said predetermined amount of time, from said integrators to eliminate spurious, nonphysical signals produced by random energy fields interacting with said sensor means.

58. The method of claim 56 wherein the step of ignoring said signal for said predetermined amount of time includes the step of opening a normally closed pair of switches to disconnect said pulse generators and prevent said first and second pulses from being output to an alarm controller to eliminate signals produced by continuous energy fields interacting with said sensor means.

59. The method of claim 56 wherein the step of ignoring said signal for said predetermined amount of time includes the step of resetting a flip-flop having an output therein and generating a logic low output for preventing said first and said second pulses from said pulse generators from being output to an alarm controller to eliminate signals produced by continuous energy fields interacting with said sensor means.

60. The method of claim 56 wherein said nonphysical signals include an EMF signal or an RF signal.

61. The method of claim 54 including the step of ignoring any signal that does not disappear and later reappear.

62. The method of claim 61 wherein said step of ignoring a signal that does not disappear and later reappear includes the steps of triggering a first or second timer to generate a third or a fourth pulse for opening of an associated normally closed switch to thereby prevent said first or second pulses from being output to an alarm controller.

63. The method of claim 62 wherein said step of ignoring a signal that does not disappear and later reappear includes the steps of triggering said first or said second timer to generate said third or said fourth pulses for opening of said normally closed switches to thereby prevent said first or second pulses from being output to said alarm controller for the duration of said threat delivered to said secured area.

64. The method of claim 63 further including the step of an alarm system controller recognizing said pulses by their associated pulsewidth as either a full alarm threat or a warn-away threat.

65. The method of claim 62 wherein the step of producing either said first pulse or said second pulse includes sending said pulses over a single conductor to an alarm controller.

66. An electronic security system for indicating a degree of threat incoming to an electronically secured area comprising:
  a) sensor means for sensing a degree of threat delivered to a secured area having the capability of outputting an electric signal having strength proportional to said degree of threat;
  b) a capacitor through which said signal is passed to remove any direct current and voltage therefrom;
  c) means for analyzing said signal to determine if it represents a low degree of threat or a high degree of threat including:

i) a signal amplifier for receiving said signal from said sensor means; and ii) a pair of voltage integrators connected to an output of said amplifier, one said integrator having a high sensitivity for responding to a low intensity amplified signal and the other said integrator having a lower sensitivity for responding to a higher intensity amplified signal and for simultaneously receiving said amplified signal from said amplifier; and d) means for producing either separate first and second pulses representing a signal containing both a low degree of threat and a high degree of threat, or said first pulse representing said low degree of threat including a pair of voltage comparators/output-pulse-generators, one connected to each said voltage integrator for comparing outputs produced from each said integrator and for producing a first pulse representing said low degree of threat from said high sensitivity integrator and for producing both said first and said separate second pulse from both said generators representing said low degree of threat from said high sensitivity integrator and said high degree of threat from said low sensitivity integrator.

67. The system of claim 66 wherein said sensor means is chosen from a group consisting of shock sensors, motion sensors, field disturbance sensors, sound discriminators, ultrasonic sensors and current sensor.

68. The system of claim 67 wherein said signal produced by said sensor means is ignored for a predetermined amount of time to eliminate spurious, nonphysical signals interacting with said sensor means.

69. The system of claim 68 wherein a normally closed switch is opened to disconnect said amplified signal, for said predetermined amount of time, from said integrators to eliminate spurious, nonphysical signals produced by random energy fields interacting with said sensor means.

70. The system of claim 68 wherein a normally closed pair of switches are opened to disconnect said first and said second pulse generators and to thereby prevent said first and second pulses from being output to an alarm controller to eliminate signals produced by continuous energy fields interacting with said sensor means.

71. The system of claim 68 wherein a flip-flop having an output therein is reset to generate a logic low output to disconnect said pulse generators and to eliminate signals produced by continuous energy fields interacting with said sensor means.

72. The system of claim 68 wherein said nonphysical signals include an EMF signal or an RF signal.

73. The system of claim 66 wherein any signal that does not disappear and later reappear is ignored.

74. The system of claim 73 wherein ignoring a signal that does not disappear and later reappear is accomplished by triggering a first or second timer to generate a third or a fourth pulse to open a normally closed associated switch to thereby prevent said first or second pulses from being output to an alarm controller.

75. The system of claim 74 wherein ignoring a signal that does not disappear and later reappear is accomplished by triggering said first or said second timer to generate said third or said fourth pulse to open said normally closed associated switch to thereby prevent said first or second pulse from being output to said alarm controller for the duration of said threat delivered to said secured area.

76. The system of claim 66 wherein said pulses are sent over a single conductor to an alarm controller.

77. The system of claim 66 wherein an alarm system controller recognizes said pulses by their associated pulse-width as either a full alarm threat or a warn-away threat.

78. A method of indicating a degree of incoming threat to an electronically secured area comprising the steps of:

a) sensing via a sensor means a degree of threat delivered to a secured area, said sensor means generating an electric signal proportional to said degree of threat;

b) analyzing said signal to determine if it represents a low degree of threat or a high degree of threat; and c) producing either a first pulse representing said low degree of threat or separately producing said first pulse and a second pulse representing a signal having both said low degree of threat and said high degree of threat.

79. The method of claim 78 wherein said sensor means is chosen from a group consisting of shock sensors, motion sensors, field disturbance sensors, sound discriminator sensors, ultrasonic sensors and current sensors.

80. The method of claim 79 wherein said electric signal is an alternating current signal whose amplitude is proportional to said degree of threat.

81. The method of claim 79 wherein the step of analyzing said signal includes the steps of:

a) amplifying said signal to produce an amplified signal;

b) impressing said amplified signal simultaneously to at least two separate integrators to produce integrated signals; and c) activating a pulse generator specific to each said integrated signal if the associated integrated signal reaches a predetermined level.

82. The method of claim 79 wherein the step of analyzing said signal further includes the steps of:

a) amplifying said signal to produce an amplified signal;

b) impressing said amplified signal simultaneously to at least two separate comparators of different sensitivity to produce a first comparator signal if the associated integrated signal reaches a first predetermined level indicating said low degree of threat signal or a second comparator signal if the associated integrated signal reaches a second, higher predetermined level indicating said high degree of threat signal; and c) activating a pulse generator specific to said first and said second comparator signals.

83. The method of claim 79 wherein the step of analyzing said signal includes the steps of:

a) amplifying said signal to produce an amplified signal;

b) impressing said amplified signal simultaneously to at least two separate integrators/comparators, each said integrator/comparator having different sensitivity; and c) activating a pulse generator specific to each said integrator/comparator to produce said first and/or said second pulse if the respective output signal reaches a predetermined level.

84. The method of claim 79 wherein said step of analyzing said signal includes the steps of:

a) amplifying said signal with an amplifier to produce an amplified signal;

b) impressing said amplified signal simultaneously to at least two separate integrators of different sensitivity to produce integrated amplified signals;

c) separately impressing said integrated, amplified signals to at least two signal comparators, one in series with each integrator and of different sensitivity, to provide a first comparator signal indicating said low degree of threat or a second comparator signal indicating said high degree of threat if the integrated, amplified signal reaches an associated predetermined level; and d) activating a pulse generator specific to each said comparator signal.

85. The method of claim 79 including the additional step of ignoring said signal produced by said sensor means for a predetermined amount of time to eliminate spurious, nonphysical signals interacting with said sensor means.

86. The method of claim 85 wherein the step of ignoring said signal includes the step of closing normally open first and second switches to prohibit processing of said signal for a predetermined amount of time to eliminate spurious, nonphysical signals produced by random energy fields interacting with said sensor means.

87. The method of claim 85 wherein the step of ignoring said signal for said predetermined amount of time includes the step of opening normally closed switches, thereby preventing said first and second pulses from being output to an alarm controller to eliminate signals produced by continuous energy fields interacting with said sensor means.

88. The method of claim 85 wherein the step of ignoring said signal for said predetermined amount of time includes the step of resetting a flip-flop having an output therein and generating a logic low output for preventing said first and said second pulses from being output to an alarm controller to eliminate signals produced by continuous energy fields interacting with said sensor means.

89. The method of claim 85 wherein said nonphysical signals include an EMF signal or an RF signal.

90. The method of claim 78 including the additional step of ignoring any signal that does not disappear and later reappear.

91. The method of claim 90 wherein said step of ignoring a signal that does not disappear and later reappear includes the steps of triggering a first or second timer to generate a third or a fourth pulse for opening of a normally closed switch to thereby prevent said first or second pulses from being output to an alarm controller.

92. The method of claim 91 wherein said step of ignoring a signal that does not disappear and later reappear includes the steps of triggering said first or said second timer to generate said third or fourth pulses for opening of said normally closed switches to thereby prevent said first or second pulses from being output to said alarm controller for the duration of said threat delivered to said secured area.

93. The method of claim 78 further including the step of sending said pulses over a single conductor to an alarm controller.

94. The method of claim 93 wherein an alarm system controller recognizes said pulses by their associated pulse-width as either a full alarm threat or a warn-away threat.

* * * * *